(12) United States Patent  
Bell et al.

(10) Patent No.: US 8,490,780 B2  
(45) Date of Patent: Jul. 23, 2013

(54) GUIDE RAIL SYSTEM

(75) Inventors: Glen A. Bell, Waterloo (CA); Michael W. Carey, Baden (CA)

(73) Assignee: Septimatech Group Inc., Waterloo, ON ( * ) Notice: Subject to any disclaimer, the term of this patent is extended or adjusted under 35 U.S.C. 154(b) by 221 days.

(21) Appl. No.: 12/897,418

(22) Filed: Oct. 4, 2010

(65) Prior Publication Data

US 2011/0079493 A1 Apr. 7, 2011

Related U.S. Application Data

(60) Provisional application No. 61/248,139, filed on Oct. 2, 2009.

(51) Int. Cl.  
*B65G 21/20* (2006.01)

(52) U.S. Cl.  
USPC ................................ 198/836.3; 198/836.1

(58) Field of Classification Search  
USPC .......................................... 198/836.3, 836.1  
See application file for complete search history.

(56) References Cited

U.S. PATENT DOCUMENTS

| | | | |
|---|---|---|---|
| 3,527,336 A | 9/1970 | Johnston | |
| 4,982,835 A | 1/1991 | Butler et al. | |
| 5,211,280 A * | 5/1993 | Houde | 198/836.3 |
| 5,291,988 A | 3/1994 | Leonard | |
| 5,492,218 A | 2/1996 | Falkowski | |
| 5,515,668 A | 5/1996 | Hunt et al. | |
| 5,517,798 A | 5/1996 | Klopfenstein | |
| 5,638,659 A | 6/1997 | Moncrief et al. | |
| 5,682,976 A | 11/1997 | Jorgensen | |
| 5,782,339 A | 7/1998 | Drewitz | |
| 5,819,911 A | 10/1998 | Ledingham | |
| 5,860,511 A | 1/1999 | Ensch et al. | |
| 5,992,616 A | 11/1999 | Kliesow et al. | |
| 6,050,396 A * | 4/2000 | Moore | 198/836.3 |
| 6,360,880 B1 * | 3/2002 | Ouellette | 198/836.1 |
| 6,378,695 B1 | 4/2002 | Rinne | |
| 6,454,084 B2 * | 9/2002 | Csiki et al. | 198/836.1 |
| 6,533,110 B1 | 3/2003 | Ledingham | |
| 6,578,702 B2 | 6/2003 | Falkowski | |
| 6,827,205 B2 | 12/2004 | Ledingham | |
| 7,310,983 B2 | 12/2007 | Schill et al. | |
| 7,431,150 B2 * | 10/2008 | Ranger | 198/836.3 |
| 7,721,876 B2 | 5/2010 | Hartness et al. | |
| 8,186,503 B1 * | 5/2012 | Burchell et al. | 198/836.3 |
| 2002/0189923 A1 * | 12/2002 | Ledingham | 198/836.3 |
| 2006/0144015 A1 * | 7/2006 | Cash et al. | 53/251 |

* cited by examiner

*Primary Examiner* — Gene Crawford  
*Assistant Examiner* — Keith R Campbell

(57) ABSTRACT

A guide rail system for guiding containers moved by a conveyor defining a path with a curved segment. The guide rail system includes a number of contact portions, for engaging the containers, to at least partially locate the containers in preselected positions on the conveyor, and a number of adjustable point devices, for locating the contact portions in predetermined locations respectively relative to the conveyor. Each adjustable point device includes an adjustment element on which one or more of the contact portions is mounted. The system also includes a drive element connected to the adjustable point devices to locate the adjustment elements, including a flexible shaft substantially aligned with the curved segment, which is connected with selected ones of the adjustable point devices are spaced apart from each other along the curved segment.

8 Claims, 31 Drawing Sheets

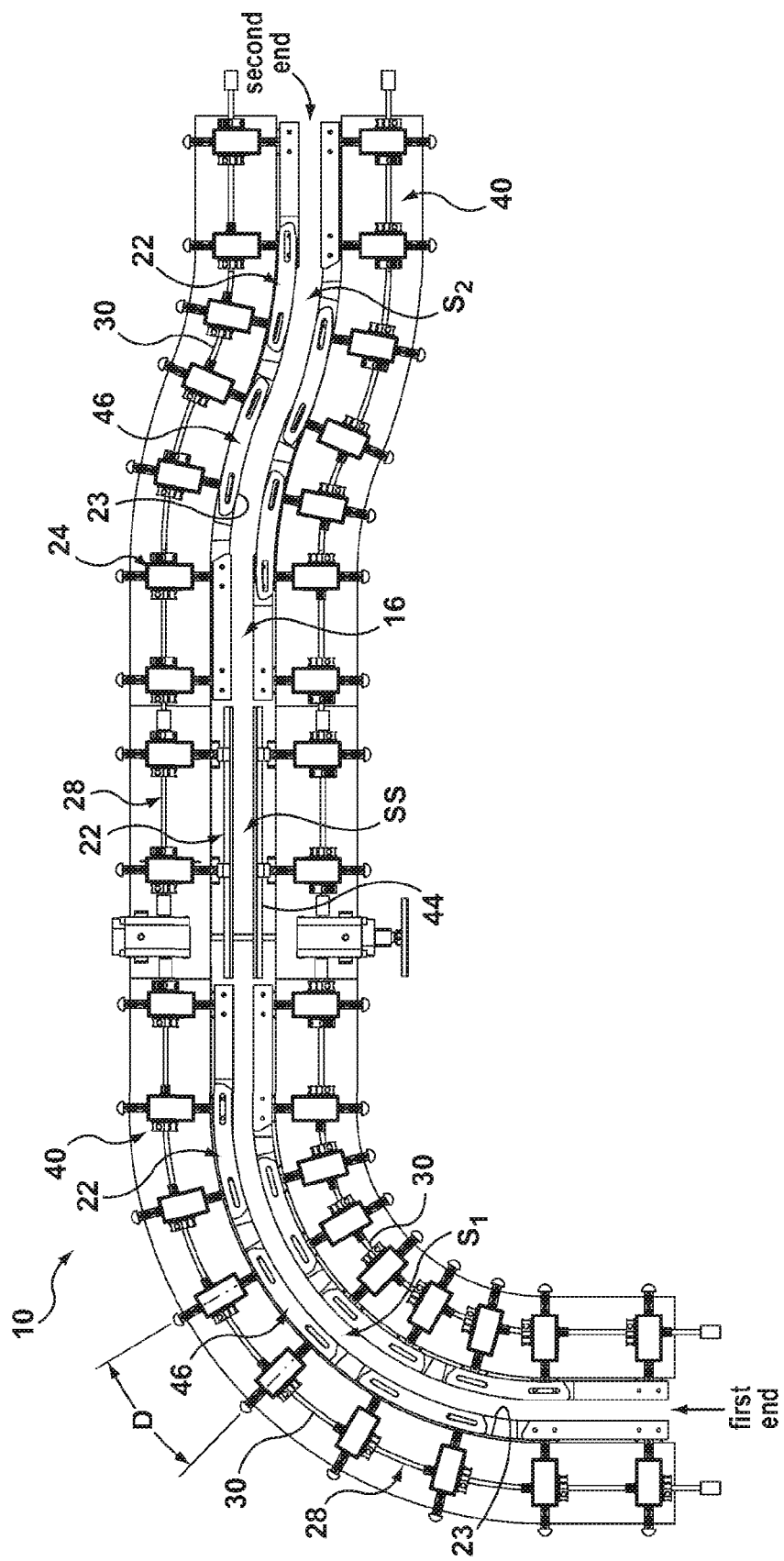

GUIDE RAIL SYSTEM

This application claims the benefit of U.S. Provisional Patent Application No. 61/248,139, filed Oct. 2, 2009, and incorporates such provisional patent application in its entirety by reference.

FIELD OF THE INVENTION

The present invention is a guide rail system for guiding containers moved by one or more conveyors.

BACKGROUND OF THE INVENTION

Conventional guide rails are fixed in position along a conveyor to guide containers as the conveyor track moves the containers past the guide rails. For example, the containers may be bottles, boxes or jars into which a product is to be placed, or which are to be further processed (e.g., capping, label application, or packaging), as is well known in the art. Also, the item conveyed may be part of a package, e.g., a cap or closure for a bottle or can. For the purposes of this application, it will be understood that "container" refers to bottles, boxes, jars, cans, and other vessels for holding materials, as well as caps or closures for such vessels. Many different types of conveyors are known, e.g., table-top conveyors, roller conveyors, belt conveyors, beaded conveyors, and air-veyors. Typically, the conveyor moves the container relatively rapidly past the guide rails. Ideally, the guide rails are formed and positioned so that the containers are gently and precisely guided between the guide rails, as is known.

The fixed conventional guide rails cannot easily be changed if the shape and/or dimensions of the containers which are to be guided thereby change. Adjustable guide rail systems are known, but they have a number of disadvantages. For instance, in one known system, the guide rail is positionable closer to, or further away from, a conveyor in predetermined increments determined by blocks which are insertable to position the guide rail. This arrangement, however, does not provide the flexibility which may be needed, because the guide rails can only be positioned in certain positions, according to the sizes of the blocks. Because the blocks only permit changes in the positions of the guide rails in predetermined increments, this prior art system cannot accommodate all changes in position. Also, in this prior art arrangement, changing the positions of the guide rails is relatively time-consuming.

In another known adjustable guide rail, an adjustment to the guide rail's position is made by using compressed air acting on cylinders, but this prior art system requires that the necessary air pressure be maintained, to hold the guide rail in a required position relative to the conveyor. Also, the ability of this prior art system to accommodate different container sizes is limited.

Because the adjustable guide rails typically are made up of a number of relatively short guide rail portions, each of which is mounted separately on its own support bracket, and because each of the guide rail portions is moved on its support bracket independently of the other guide rail portions, adjusting the known adjustable guide rail systems for different containers tends to be a time-consuming, and sometimes difficult, job.

It is important that the guide rails be accurately positioned relative to the conveyor, and the containers thereon. For instance, if the containers are not properly positioned by the guide rails, the containers may "shingle", or jam, frequently. Also, where the containers are guided into equipment in which the containers are processed or acted on (e.g., fillers, or labelling machines), if the containers are not properly positioned, they will not be properly processed. In general, the accuracy of the adjustable guide rail systems of the prior art is not particularly good.

SUMMARY OF THE INVENTION

For the foregoing reasons, there is a need for a guide rail system that overcomes or mitigates one or more of the disadvantages of the prior art.

In its broad aspect, the invention provides a guide rail system for guiding containers moved by one or more conveyors, the conveyor(s) at least partially defining a path along which the containers are moved thereby. The guide rail system includes a number of contact portions for engaging the containers, to at least partially locate the containers in preselected positions on the conveyor, and a number of adjustable point devices, for locating the contact portions in predetermined locations respectively relative to said at least one conveyor, for engagement with the containers as the containers are moved past the contact portions by the conveyor. Each adjustable point device includes an adjustment element on which one or more of the contact portions is mounted, the adjustment element being movable relative to the conveyor to position the contact portion(s) mounted thereon in the predetermined location therefore. The guide rail system also includes a drive element connected to the adjustable point devices, to locate the adjustment elements for positioning the contact portion(s) respectively mounted thereon in the predetermined locations respectively. The path includes one or more curved segment thereof at least partially defining an arc. The drive element includes one or more flexible shafts substantially aligned with the curved segment. Selected ones of the adjustable point devices are spaced apart from each other along the curved segment, and the flexible shaft is connected to the selected ones of the adjustable point devices respectively, to position the contact portions mounted thereon in the predetermined locations therefor.

In another aspect, the invention additionally includes a number of support brackets on which the adjustable point devices are mounted. The support brackets are positionable respectively to locate the adjustable point devices respectively in predetermined positions relative to the conveyor.

In yet another aspect, the guide rail system additionally includes a template element for positioning the adjustable point devices in preselected positions respectively relative to the conveyor.

In another of its aspects, the invention additionally includes a number of central contact portions, for engaging closures on the containers, to at least partially locate the containers in the preselected positions on the conveyor, and a number of central adjustable point devices, for locating the central contact portions in predetermined central locations respectively relative to the conveyor, for engagement with the closures on the containers as the containers are moved past the central contact portions by the conveyor. Each central adjustable point device includes an adjustment element on which one or more of the central contact portions is mounted, the adjustment element being movable relative to the conveyor to position the central contact portion in the predetermined central location therefore. The guide rail system also includes a central drive element connected to the central adjustable point devices, to position the adjustment elements for positioning the central contact portion(s) respectively mounted thereon in the predetermined central locations respectively. The central drive element includes one or more central flexible shafts substantially aligned with the curved segment. Selected ones of the central adjustable point devices are positioned at preselected central positions spaced apart from each other along the curved segment, and the central flexible shaft is connected to the selected ones of the central adjustable point devices respectively, to position the central contact portions mounted thereon in the predetermined central locations therefor.

In another of its aspects, the invention provides a guide rail system for guiding containers on one or more conveyors along which the containers are moved thereby. The guide rail system includes a number of contact portions, for engaging the containers to at least partially locate the containers in preselected positions on the conveyor, and a number of adjustable point devices to locate the contact portions in predetermined locations respectively relative to said at least one conveyor, for engagement thereby with the containers as the containers are moved past the contact portions by said at least one conveyor. Each adjustable point device includes an adjustment element on which one or more of the contact portions is mounted, the adjustment element being movable relative to the conveyor to position the contact portion(s) mounted thereon in the predetermined location therefore. The guide rail system also includes a drive element connected to the adjustable point devices to position the adjustment elements for locating the contact portion(s) respectively mounted thereon in the predetermined locations respectively. In addition, the guide rail system includes gear train for rotating the drive element, the gear train being adapted for resisting movement initiated at the drive element.

In yet another aspect, the gear train includes a gearbox, a driven gear rotatably mounted in the gearbox and operably connected to the drive element, a drive gear rotatably mounted in the gearbox and drivably coupled to the driven gear, and a driving element drivably coupled to the drive gear, for driving the drive gear. The driven gear and the drive gear have a gear ratio providing a mechanical advantage to driving the drive gear with the driving element so that the driven gear resists rotational movement thereof initiated at the drive element.

In another of its aspects, the invention additionally includes a number of central contact portions, for engaging closures on the containers, to at least partially locate the containers in the preselected positions on the conveyor, and a number of central adjustable point devices, for locating the central contact portions in predetermined central locations respectively relative to the conveyor, for engagement thereby with the closures on the containers as the containers are moved past the central contact portions by the conveyor. Each said central adjustable point device includes an adjustment element on which one or more of the central contact portions is mounted, the adjustment element being movable relative to the conveyor to position the central contact portion(s) mounted thereon in the predetermined central location therefore. The guide rail system also includes a central drive element connected to the central adjustable point devices to position the adjustment elements for locating the central contact portion(s) respectively mounted thereon in the predetermined central locations respectively, and a central gear train for rotating the central drive element, the central gear train being adapted for resisting movement initiated at the central drive element.

In yet another of its aspects, the invention additionally includes a central gearbox, a central driven gear rotatably mounted in the central gearbox and operably connected to the central drive element, a central drive gear rotatably mounted in the central gearbox and drivably coupled to the central driven gear, and a central driving element drivably coupled to the central drive gear, for driving the central drive gear. The central driven gear and the central drive gear have a central gear ratio providing a mechanical advantage to driving the central drive gear with the driving element so that the central driven gear resists rotational movement thereof initiated at the central drive element.

In another aspect, the invention provides a guide rail system for guiding containers on one or more conveyors along which the containers are moved thereby. The guide rail system includes a number of central contact portions, for engaging the closures on the containers to at least partially locate the containers in preselected positions on the conveyor, and a number of central adjustable point devices, for locating the central contact portions in predetermined central locations respectively relative to the conveyor, for engagement thereby with the closures on the containers as the containers are moved past the central contact portions by the conveyor. Each said central adjustable point device includes an adjustment element on which one or more of the central contact portions is mounted, the adjustment element being movable relative to the conveyor to position the central contact portion(s) mounted thereon in the predetermined central location therefore. The guide rail system also includes a central drive element connected to the central adjustable point devices to position the adjustment elements for locating the central contact portion(s) respectively mounted thereon in the predetermined central locations respectively, and a central gear train for rotating the central drive element, the central gear train being adapted for resisting movement initiated at the central drive element.

BRIEF DESCRIPTION OF THE DRAWINGS

The invention will be better understood with reference to the attached drawings, in which:

FIG. 1C is a plan view of the guide rail system of FIG. 1A;

DETAILED DESCRIPTION

Figure 3A:
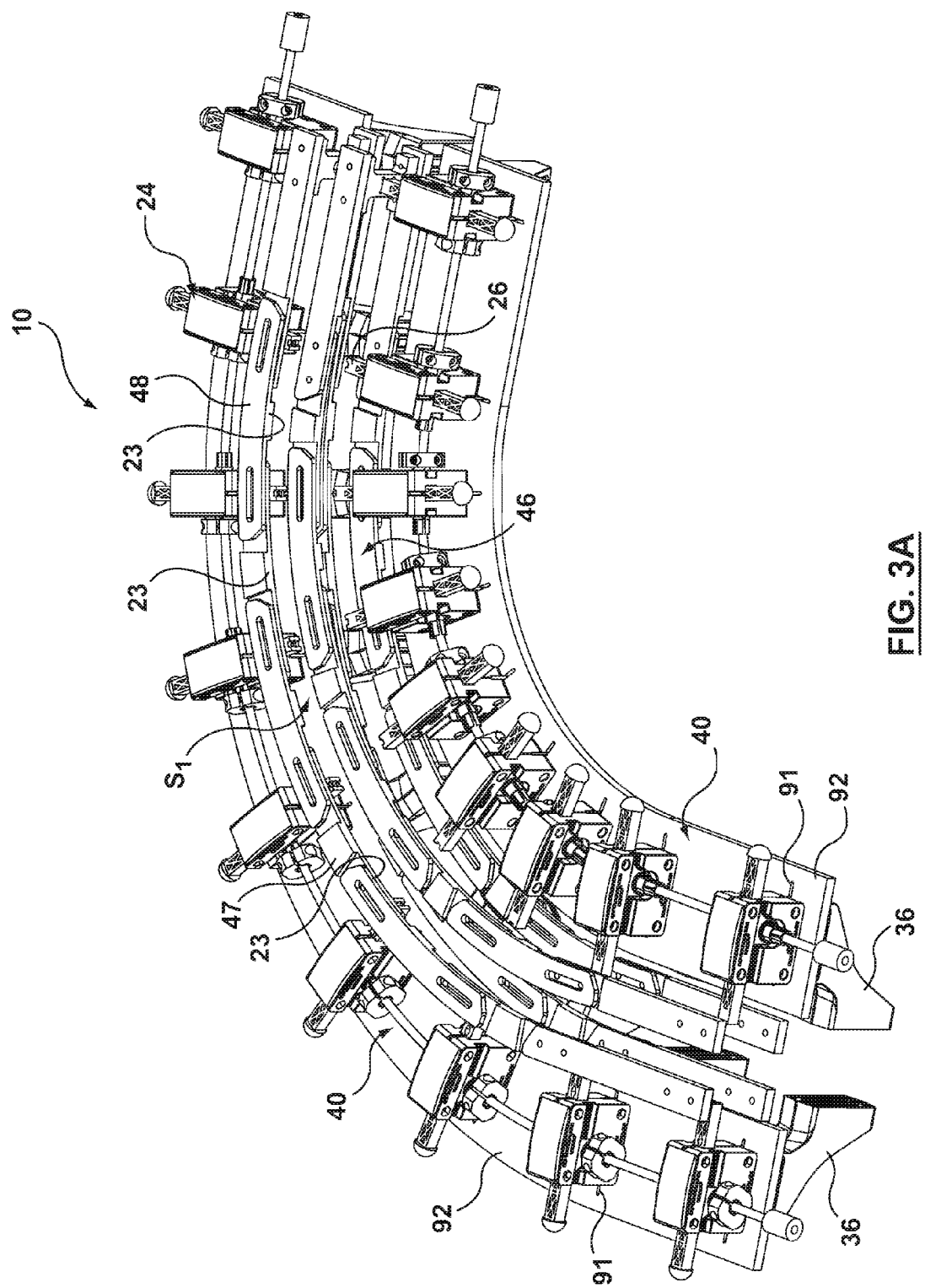
FIG. 3A is an isometric view of another curved segment of the guide rail system of FIGS. 1A-1C, drawn at a larger scale.
Figure 3B:
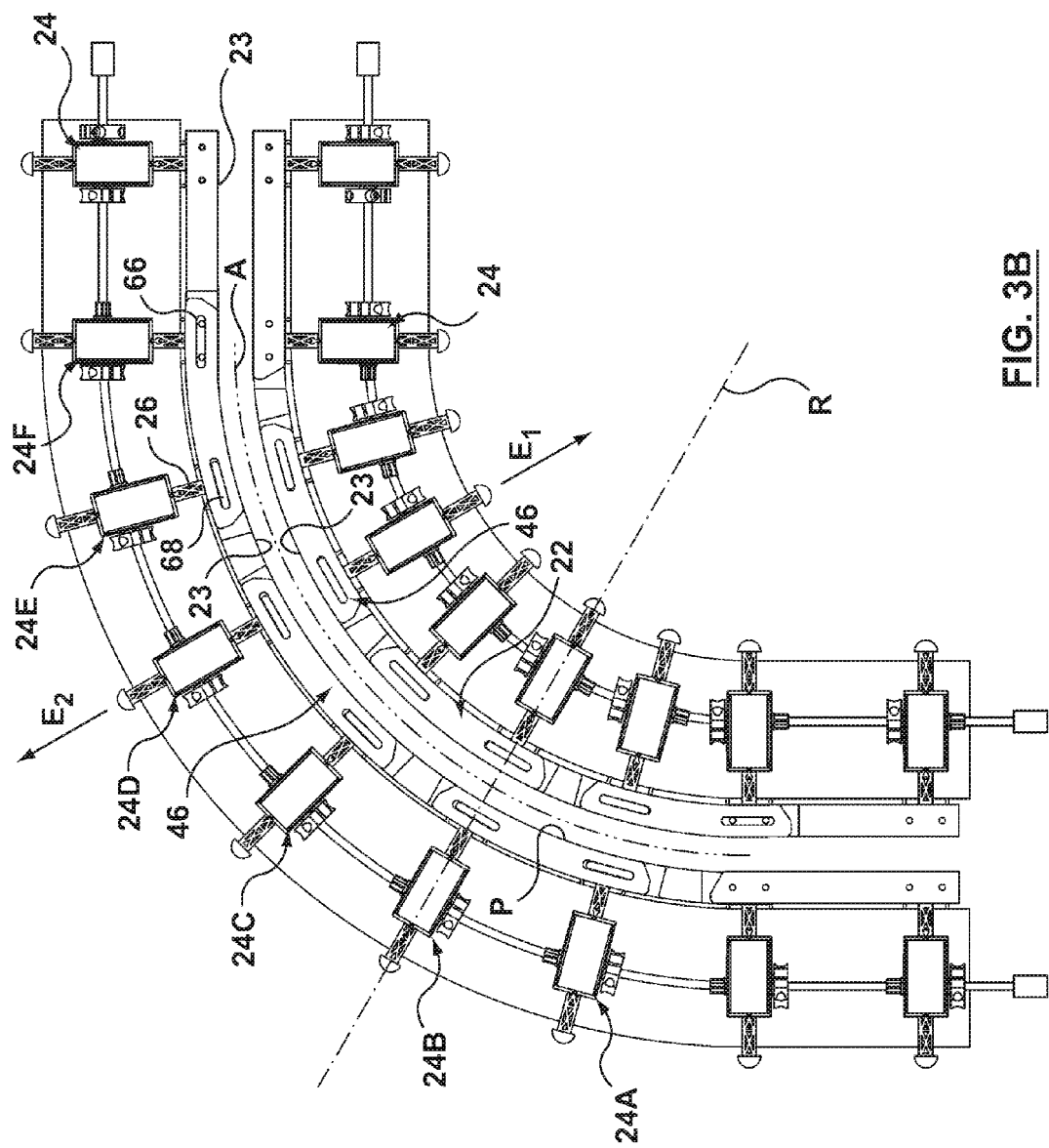
FIG. 3B is a plan view of the curved segment of FIG. 3A, drawn at a larger scale.
Figure 4A:
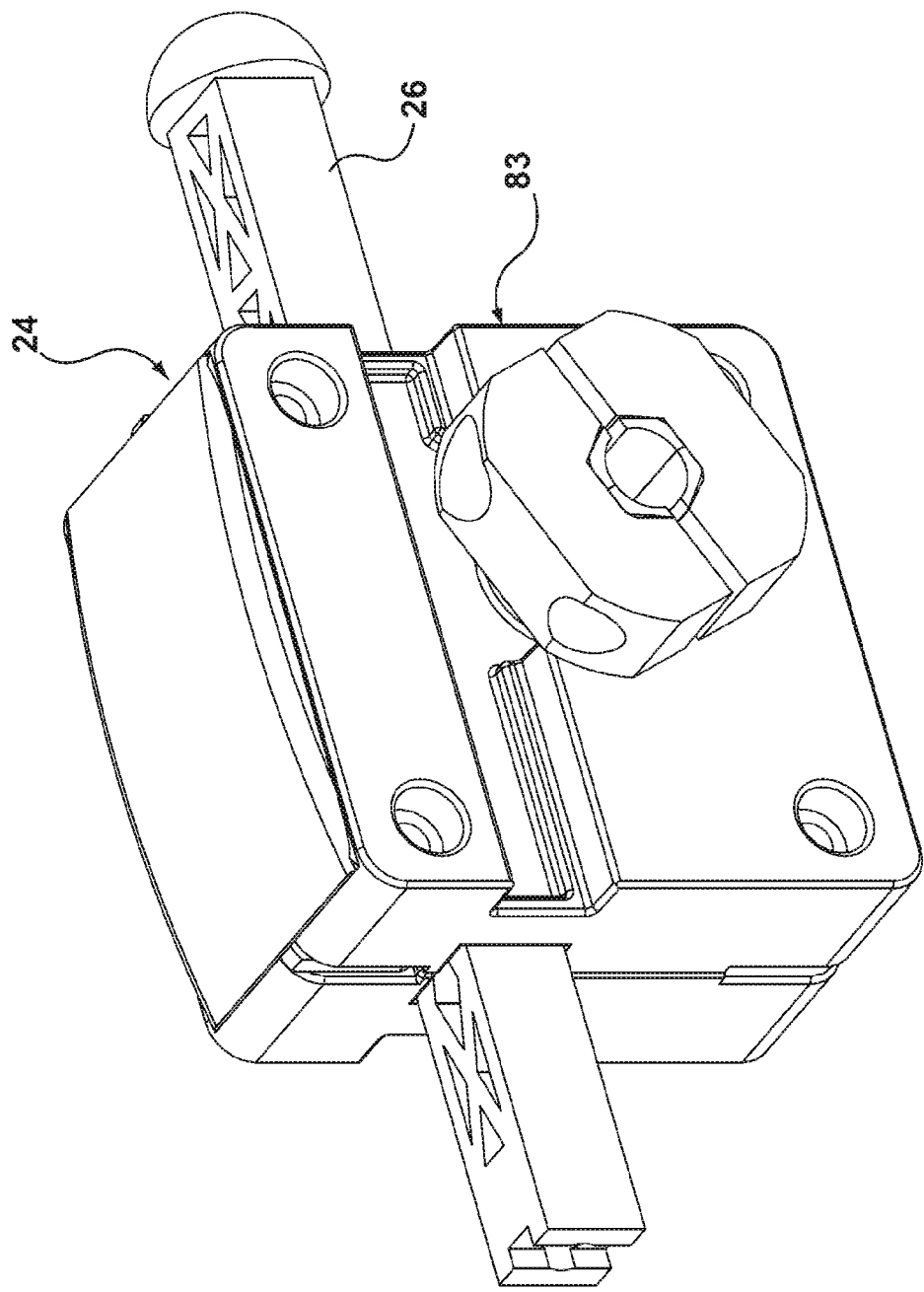
FIG. 4A is an isometric view of an embodiment of an adjustable point device of the invention, drawn at a larger scale.
Figure 4B:
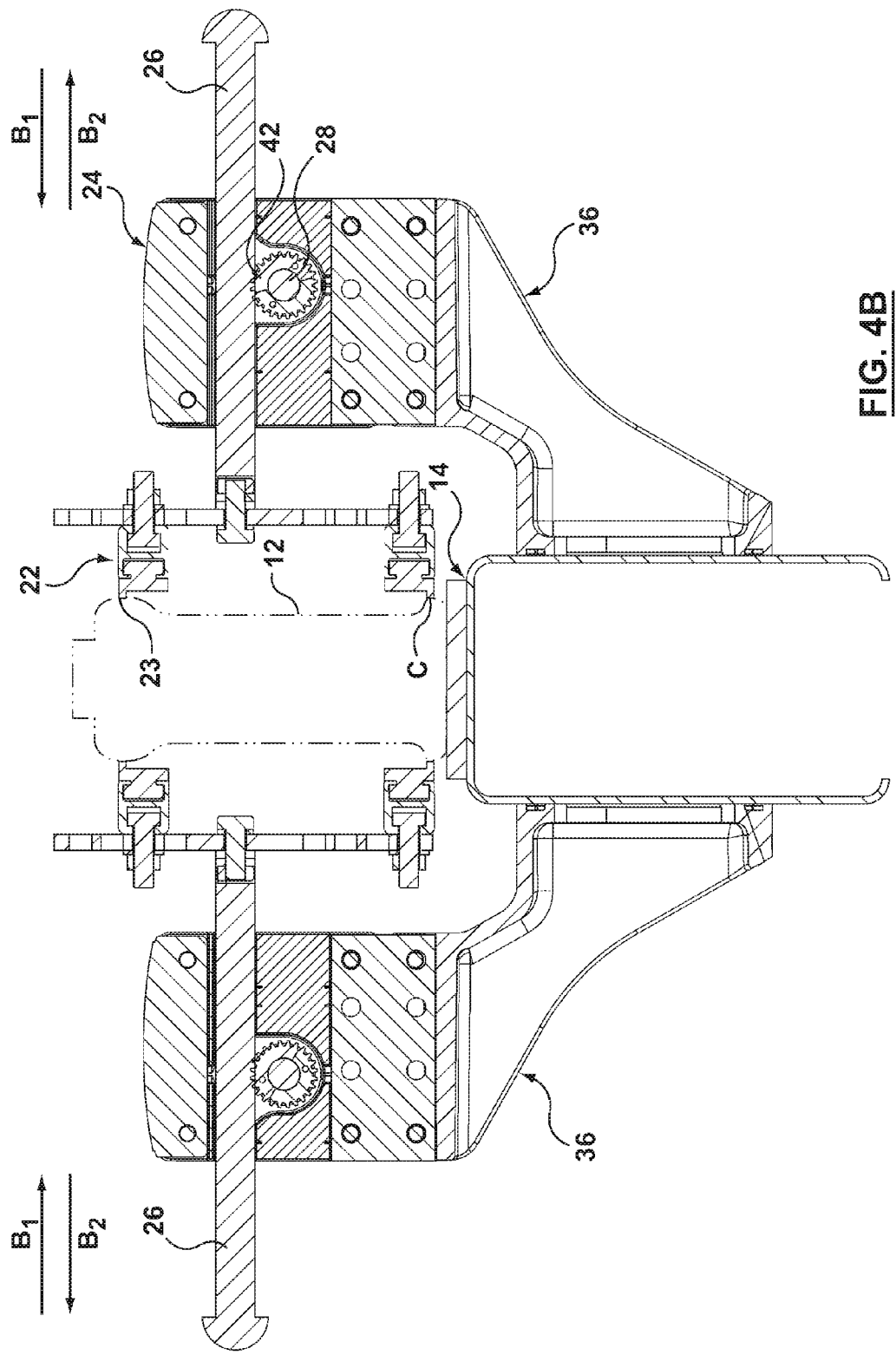
FIG. 4B is a cross-section of two opposed adjustable point devices mounted on support brackets, drawn at a smaller scale.

In the attached drawings, like reference numerals designate corresponding elements throughout. Reference is first made to FIGS. 1A-5B to describe an embodiment of a guide rail system in accordance with the invention indicated generally by the numeral 10. The guide rail system 10 is for guiding containers 12 which are moved by one or more conveyors 14 (FIG. 4B). Each conveyor 14 at least partially defines a path 16 (FIG. 1C) along which the containers 12 are moved thereby. In one embodiment, the guide rail system 10 preferably includes a number of contact portions 22 (FIGS. 4B, 5B) for engaging the containers 12, to at least partially locate the containers 12 in preselected positions on the conveyor 14, as will be described. The guide rail system 10 preferably also includes a number of adjustable point devices 24 for locating the contact portions 22 in predetermined locations respectively relative to the conveyor 14, for engagement with the containers 12 as the containers 12 are moved past the contact portions 22 by the conveyor 14. It is preferred that each adjustable point device 24 includes an adjustment element 26 on which one or more of the contact portions 22 is mounted (FIGS. 4A, 4B). The adjustment element 26 is movable relative to the conveyor 14 to position the contact portion 22 in the predetermined location therefor. It is also preferred that the guide rail system 10 includes a drive element 28 connected to the adjustable point devices 24, to locate the adjustment elements 26 for positioning the contact portions 22 mounted thereon in the predetermined locations respectively. Preferably, the path 16 includes one more curved segments "S" at least partially defining an arc "A" (FIGS. 3A, 3B). Also, the drive element 28 preferably includes one or more flexible shafts 30 substantially aligned with the curved segment S. Selected ones of the adjustable point devices 24 preferably are spaced apart from each other along the curved segment S, as will also be described. The flexible shaft 30 is connected to the selected ones of the adjustable point devices 24 respectively, to position the contact portions 22 mounted thereon in the predetermined locations therefor.

Figure 11A:
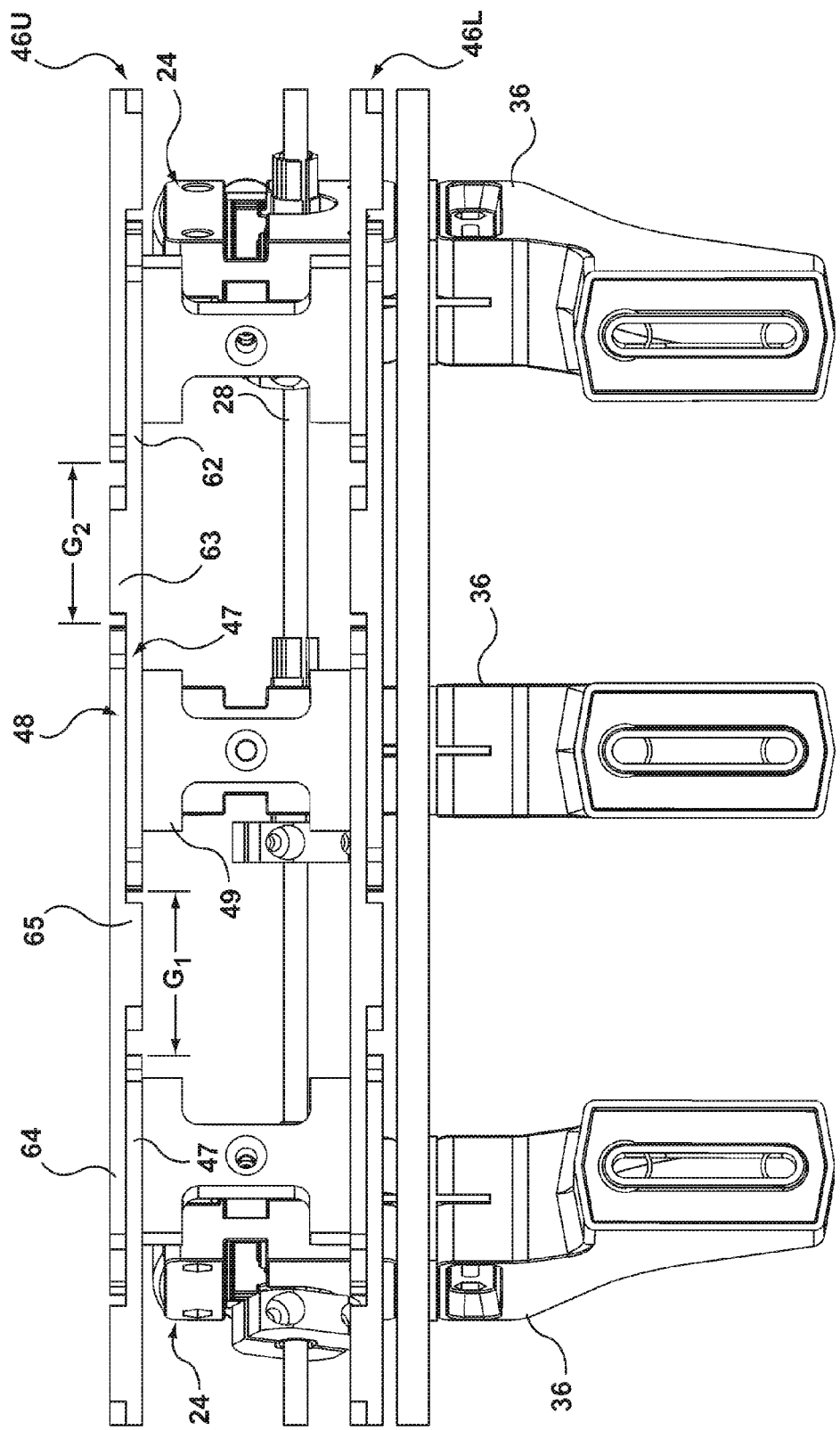
FIG. 11A is an elevation view of an embodiment of a curved segment of the system of the invention, drawn at a smaller scale.

In one embodiment, the contact portions 22 mounted on the selected ones of the adjustable point devices 24 substantially define a parallel arc "P" spaced apart from the arc A (FIG. 3B). Preferably, and as can be seen in FIGS. 3A and 11A, the contact portions 22 mounted on the selected ones 32 of the adjustable point devices 24 overlap with each other to provide a substantially continuous surface 23 for engagement thereby with the containers 12, as the containers 12 are moved along the curved segment S.

Figure 5A:
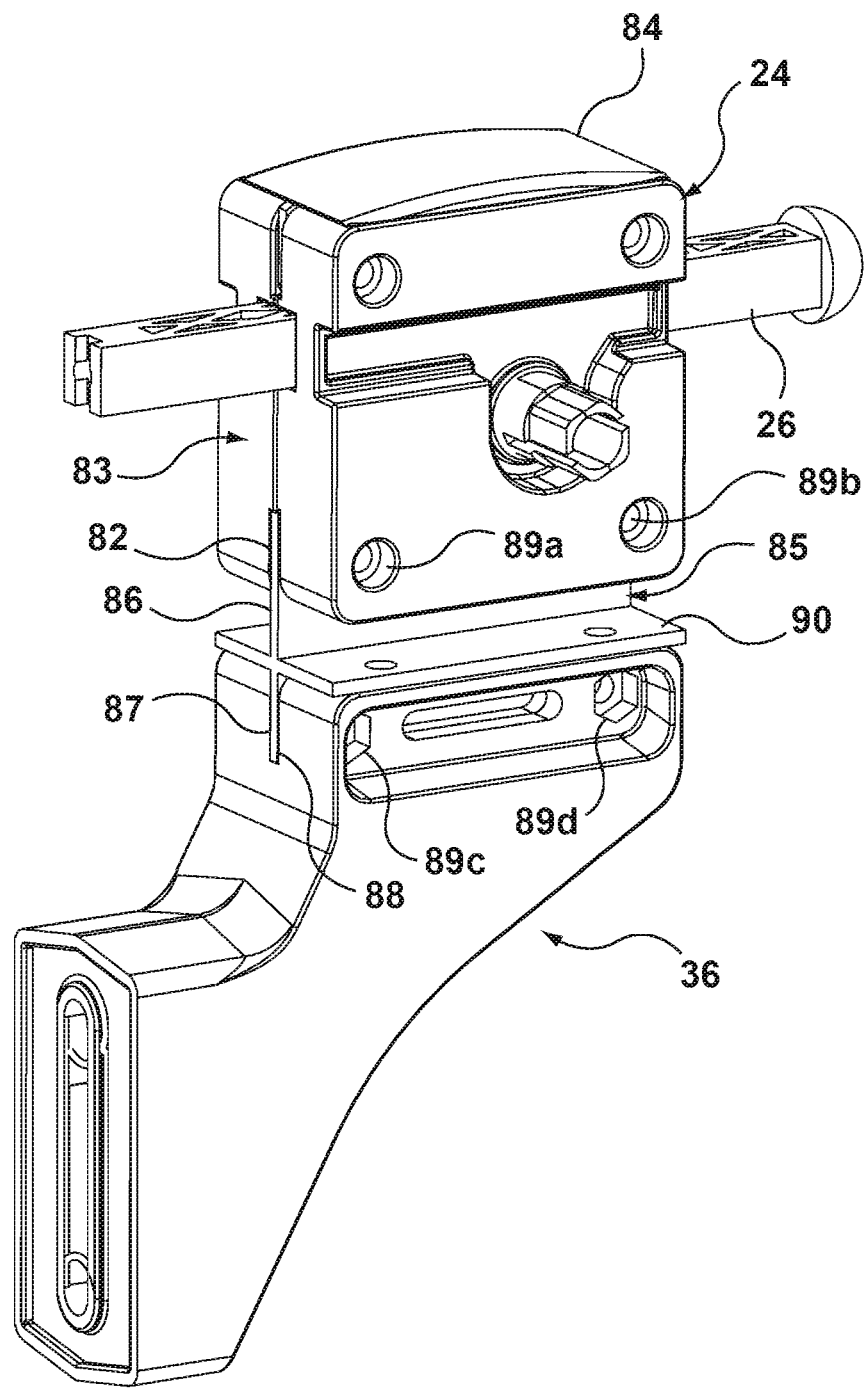
FIG. 5A is an isometric view of the adjustable point device of FIG. 4A mounted on a support bracket, drawn at a larger scale.
Figure 5B:
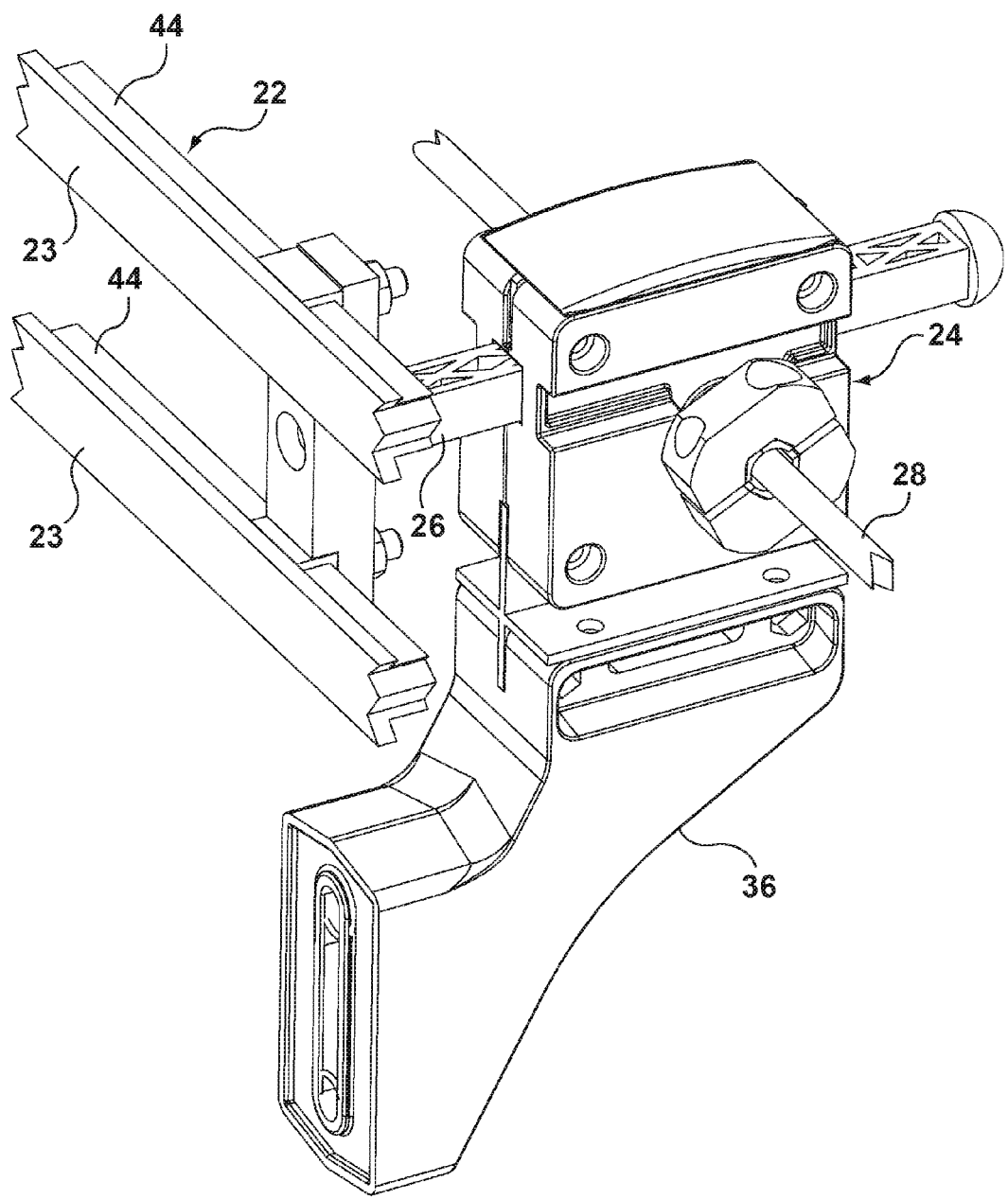
FIG. 5B is an isometric view of the adjustable point device and support bracket of FIG. 5A with a contact portion mounted on an adjustment element thereof, drawn at a smaller scale.

Preferably, the guide rail system 10 also includes a number of support brackets 36 on which the adjustable point devices 24 are mounted, the support brackets 36 being positionable respectively to locate the adjustable point devices 24 respectively in predetermined positions relative to the conveyor 14 (FIGS. 5A, 5B). It is also preferred that one or more of the adjustable point devices 24 is mounted on a plate 38 attached to a selected support bracket 36 to position the adjustable point device 24 in an offset position relative to the selected support bracket 36, for locating the contact portion 22 mounted thereon in the predetermined location. (FIGS. 5A, 5B, 6, 7)

In one embodiment, and as can be seen in FIGS. 1A-3B, it is also preferred that the guide rail system 20 includes a template element 40 for positioning the adjustable point devices 24 in preselected positions respectively relative to the conveyor 14.

As can be seen in FIG. 4B, the container 12 is located in the preselected position on the conveyor 14 by the contact portions 22. Typically (but not necessarily), the preselected position is substantially in the center of the conveyor 14. The container 14 is moved past the contact portions 22 by the conveyor 14, and while so moving, the container 14 slidingly engages the contact portions 22 along the path 16 successively, and the contact portions 22 thereby maintain the container 14 in the preselected position relative to the conveyor. In most applications, the conveyor 14 moves the containers 12 past the contact portions 22 at a relatively high speed. As is well known in the art, in general, accurate positioning of the contact portions 22 relative to the conveyor 14 is highly desirable, due to the relatively fast movement of the containers 12 past the contact portions 22. That is, because of the relatively fast movement of the containers past the contact portions 22, even relatively small errors in locating the contact portions 22 can have significant effects on the operation of the conveyor 14.

It will be understood that the contact portions 22 are shown in FIG. 4B as being positioned for sliding engagement of the containers 12 with the contact portions 22. The contact portions 22 are formed and positioned to achieve the desired degree of engagement with the container 12, and the form taken by the contact portion 22 is at least partly determined by the shape of the container 12. The container 12 illustrated in FIG. 4B is exemplary only, and those skilled in the art will appreciate that containers 12 may have a wide variety of shapes, including irregular (i.e., asymmetric) shapes. For instance, there are four contact portions 22 shown in FIG. 4B (designated as 22A-22D for clarity), because of the shape of the container 12, i.e., the protruding upper and lower parts of the container 12. Also, each of the contact portions 22A-22D is shown as including a protruding part (designated "C" in FIG. 4B) with a contact surface 23 thereon designed, when properly positioned, to slidingly engage the protruding upper and lower parts of the container 12 to the appropriate extent, i.e., to at least partially locate the containers in the preselected position on the conveyor 14.

Figure 1A:
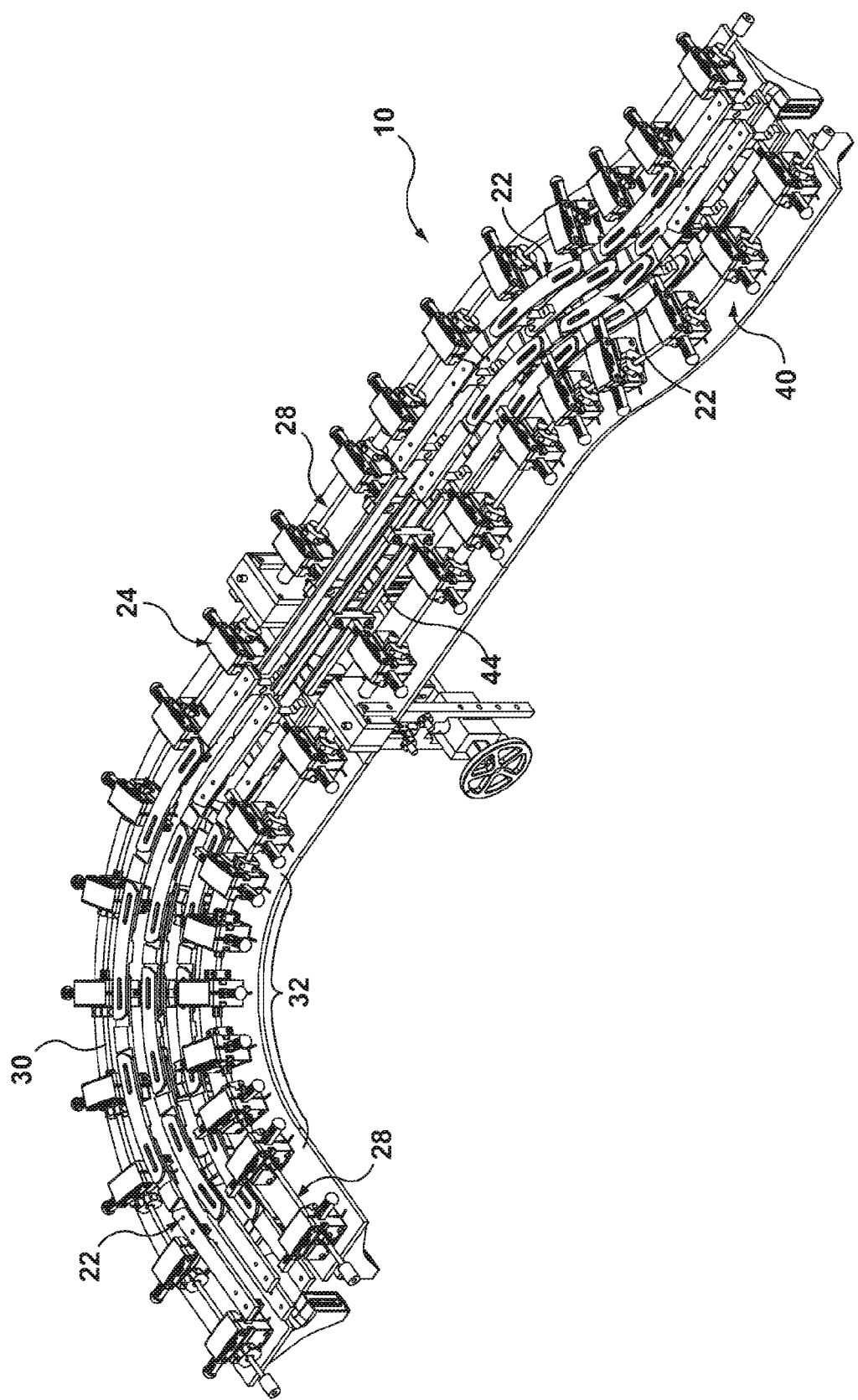
FIG. 1A is an isometric view of an embodiment of a guide rail system of the invention.
Figure 1B:
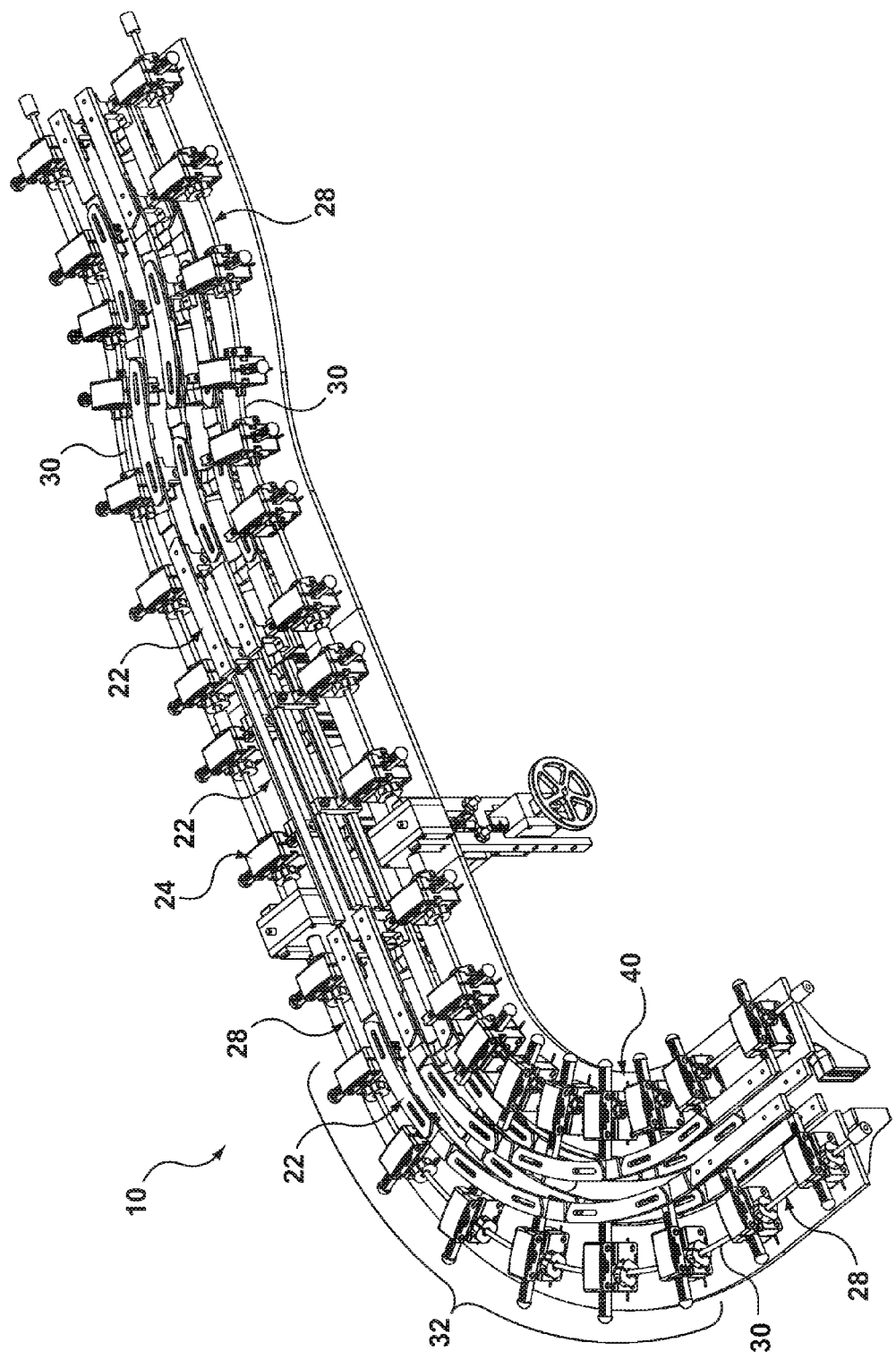
FIG. 1B is another isometric view of the guide rail system of FIG. 1A.
Figure 2:
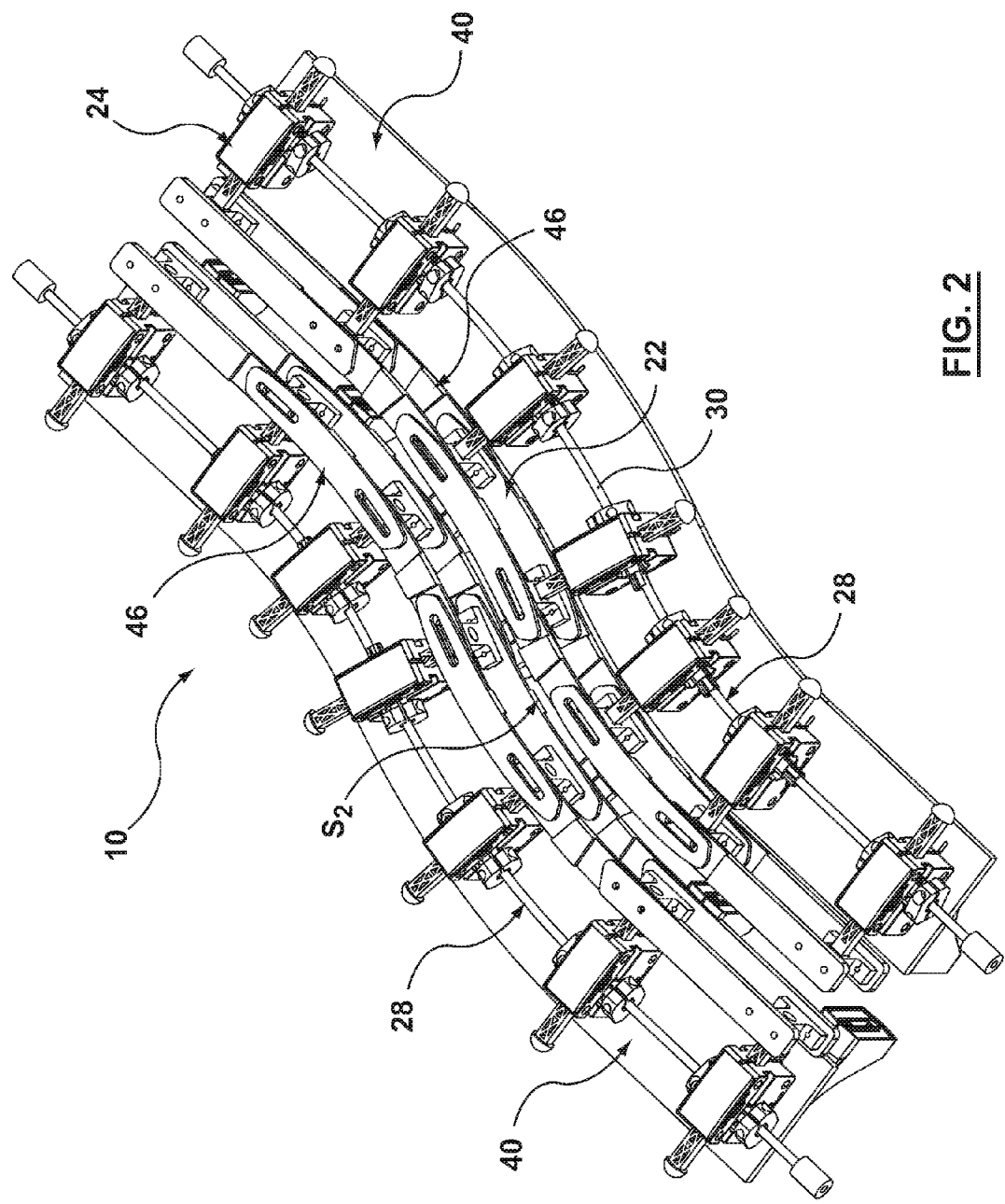
FIG. 2 is an isometric view of a curved segment of the guide rail system of FIGS. 1A-1C, drawn at a larger scale.

As can be seen in FIG. 1C, the conveyor 14 at least partially defines its path 16, which consequently is also the path travelled by the containers. For clarity of illustration, the ends of the path 16 of the conveyor 14 are identified as "first end" and "second end" in FIG. 1C. In FIG. 1C, the path includes two curved segments (identified as "$S_1$" and "$S_2$" for clarity) and a straight segment ("SS") therebetween. It can also be seen in FIG. 1C that the contact portions 22 along the straight segment SS of the path 16 are substantially straight, but the contact portions 22 positioned along the curved segments $S_1$, $S_2$ are linked together, and overlap each other, as will be described. It will be understood that the system 10 as illustrated in FIGS. 1A-1C is exemplary only. Those skilled in the art will appreciate that, depending on the path of the conveyor(s), the system 10 may be arranged in many different ways. It will also be understood that the guide rail system includes curved segments thereof and straight segments adjacent to and following those in the path. For example, in FIGS. 1A-1C, the curved segment $S_2$ is a "crossover" segment, for guiding containers from one conveyor to another, adjacent conveyor (not shown in FIGS. 1A-1C.

As can be seen in FIG. 4B, in the adjustable point device 24, the adjustment element 26 preferably is a rack in a rack and pinion mechanism. The drive element 28 is secured to the pinion 42. Rotation of the drive element 28 thus causes rotation of the pinion 42, which results in movement of the adjustment element 26 in the direction of the arrows "$B_1$" or "$B_2$" in FIG. 4B.

The movement indicated by arrow $B_1$ is inward, and the movement indicated by arrow $B_2$ is outward. As will be described, although adjustable point devices are shown on both sides of the conveyor 14 in FIG. 4B, the system 10 may include adjustable point devices on one side only of the conveyor, for example, if one side of the conveyor has fixed contact portions therealong.

In the part of the system 10 positioned along the straight segment SS (FIG. 1C), the drive element 28 preferably includes a suitable straight shaft, e.g., a rod or a bar. However, in parts of the system 10 positioned along the curved segments $S_1$, $S_2$, the drive element 28 preferably include the flexible shaft 30. Any suitable flexible shaft may be used. It has been found that a flexible bidirectional multi-layered shaft with a diameter of about ⅜ inch is suitable. (Those skilled in the art will appreciate that, if desired, the drive element 28 may include the flexible shaft along the straight segment SS.)

The curved segment $S_1$ is shown alone in FIGS. 3A and 3B for clarity of illustration. The arc A is also shown in FIG. 3B.

As described above, the adjustable point devices 24 locate the contact portions 22 in predetermined locations relative to the conveyor 14. For instance, the contact portions 22A-22D are shown in the predetermined locations in FIG. 4B. In the part of the system 10 positioned along the curved segments $S_1$, $S_2$, the adjustment of the positions of the contact portions is effected when the drive element 28 is rotated in the appropriate direction. As can be seen in FIG. 3B, the adjustable point devices 24 in the curved segments $S_1$, $S_2$ (i.e., selected ones of the adjustable point devices 24) are spaced apart from each other along the curved segments. For example, the adjustable point devices in the curved segment S, (identified for convenience in FIG. 3B as 24A-24F) are positioned along an arc which is parallel to the arc A, and spaced apart from each other. By way of example, the adjustable point devices 24A and 24B are spaced apart from each other by the distance "D" (FIG. 1C).

When the drive element 28 is rotated, the adjustment elements 26 are moved accordingly, resulting in an appropriate positioning of the contact portions. Each of the adjustment elements moves the same distance. Because the drive element 28 along the curved segments is a flexible shaft, it rotates by the same amount about its axis at all points along it in the curved segment $S_1$, even though it is positioned along an arc substantially parallel to the arc A. As can be seen in FIG. 3B, each of the adjustment elements 26 in the adjustable point devices 24A-24F is substantially aligned with a radius of the arc A. The radius "R" of the arc A is shown in FIG. 3B. Movement in a direction substantially aligned with the radius R is hereinafter referred to as "radial" movement. From the foregoing, it can be seen that rotation of the drive element 28 in the curved segment $S_1$ results in radial movement of the adjustment elements 26 in the adjustable point devices 24A-24F by substantially the same distance.

Figure 11B:
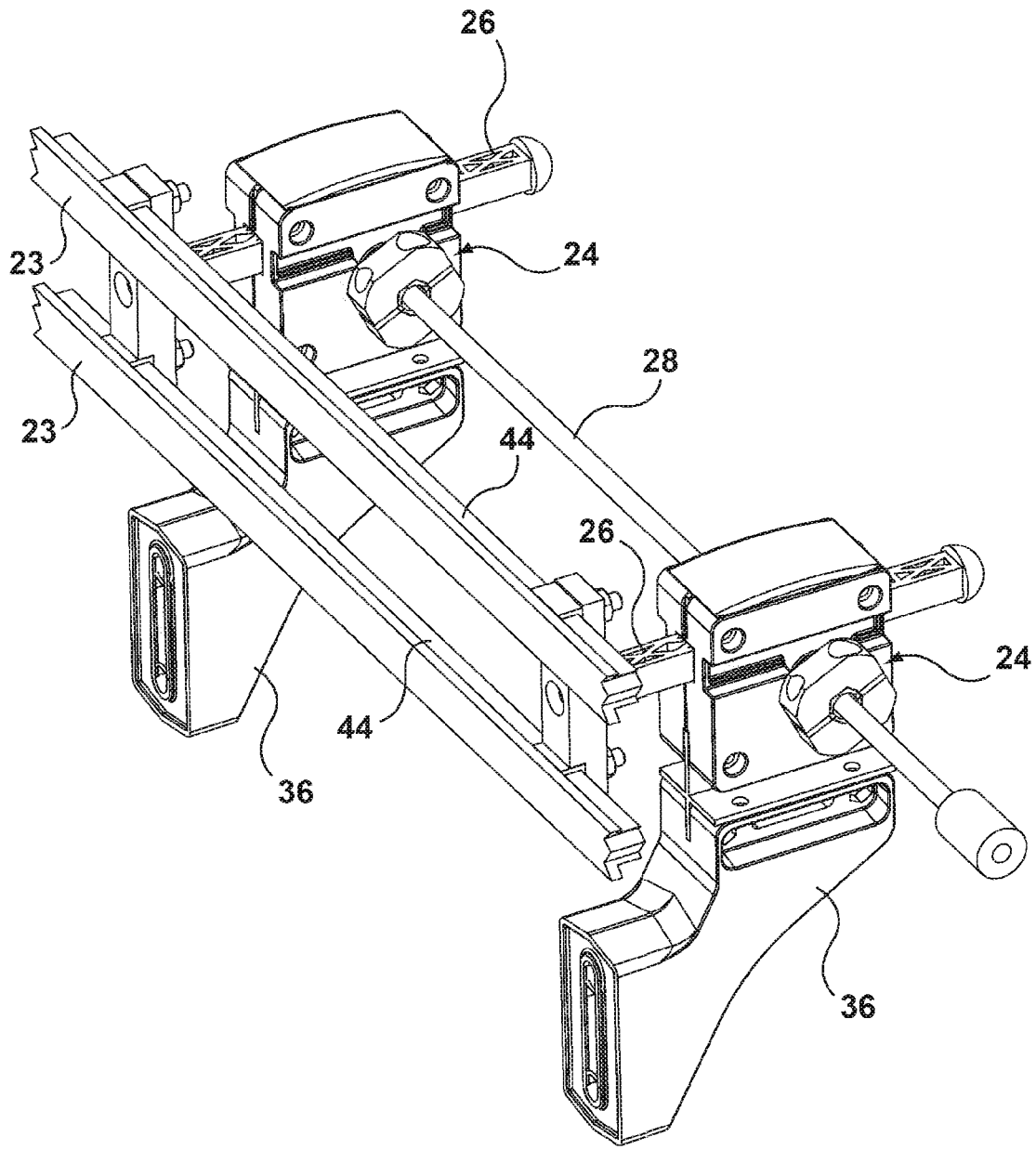
FIG. 11B is an isometric view of a part of a straight segment of the system of the invention.
Figure 11C:
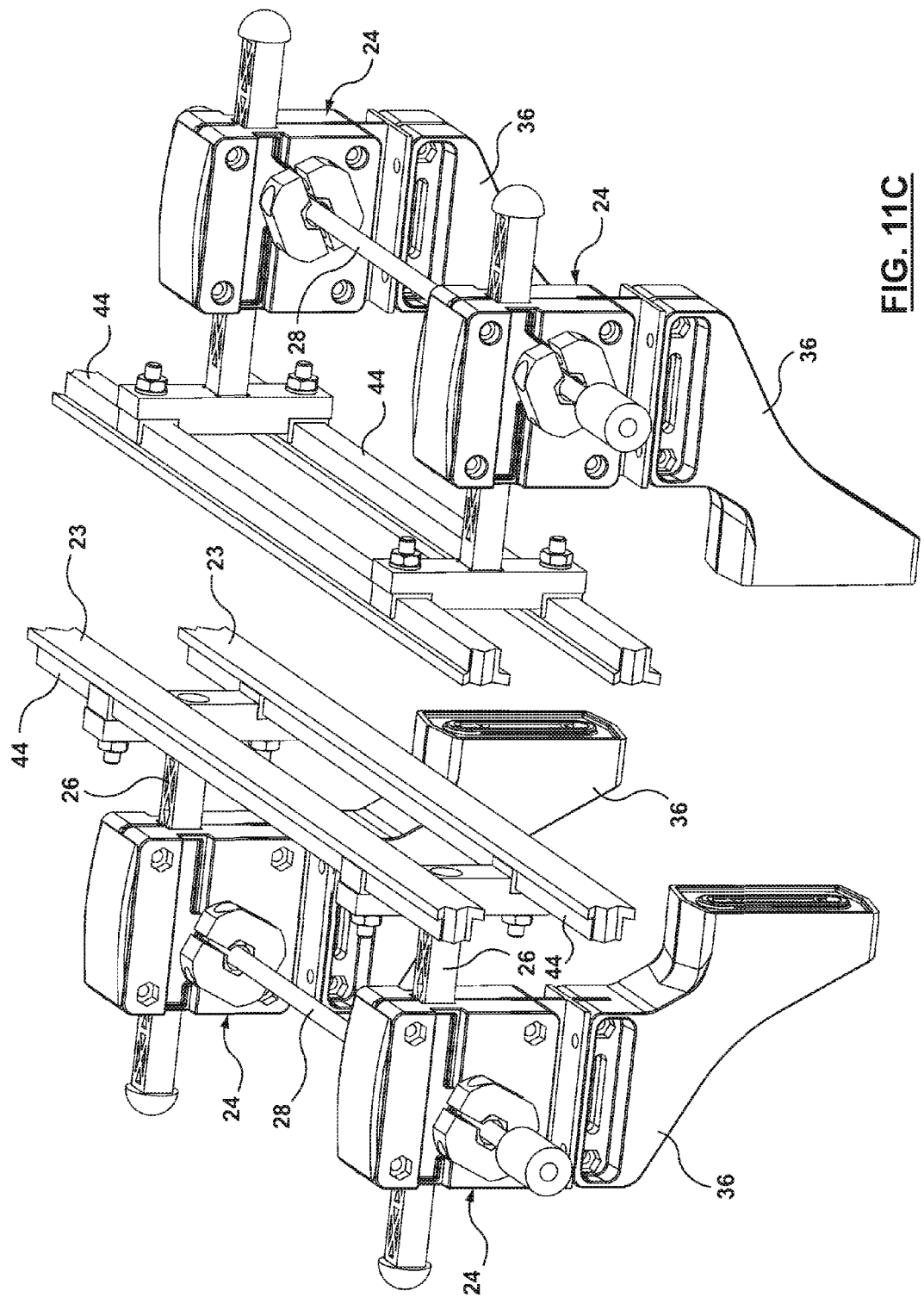
FIG. 11C is an isometric view of part of both sides of the straight segment of the system of the invention.

As can be seen in FIG. 1C, along the straight segment SS, the contact portions 22 preferably are substantially straight bars 44, connected (directly or indirectly) to the adjustment elements 26. The adjustable point device 24 with bars 44 mounted on the adjustment element 26 is shown in FIG. 5B. The contact surfaces 23 provided by the contact portions 22 (i.e., the upper and lower bars 44, in this case) are shown in FIG. 5B. Additional arrangements of adjustable point devices 24 supporting straight bars 44 are provided in FIGS. 11B and 11C. Those skilled in the art will appreciate that the arrangements illustrated in FIGS. 5B, 11B, and 11C are exemplary only. It will be understood that, depending on the container, only one straight bar 44, or more than two straight bars 44, may be used in the straight segments SS of the system 10.

Along the curved segments $S_1$, $S_2$, the contact portions 22 preferably are slip rail assemblies 46. As illustrated in FIG. 11A, there are two slip rail assemblies, i.e., an upper slip rail assembly and a lower slip rail assembly (identified as 46U and 46L in FIG. 11A for clarity). In the following description, only the upper slip rail assembly will be described in detail, it being understood that the lower slip rail assembly is identical to the upper slip rail assembly in all material respects.

The slip rail assembly 46U preferably includes inner segments 47 and outer segments 48. As can be seen in FIG. 11A, the inner segments 47 preferably are mounted on the adjustment elements 26 (not shown in FIG. 11A), via mounting brackets 49 which are attached to the adjustment elements 26 respectively. As can be seen in FIG. 3A, the inner and outer segments 47, 48 include inner and outer contact surfaces 62, 64 respectively. There are gaps (identified as "$G_1$" in FIG. 11A) between the inner segments 47 which are bridged by the outer segments 48, and gaps (identified as "$G_2$" in FIG. 11A) between the outer segments 48 which are bridged by the inner segments 47. The inner and outer segments 47, 48 also include inner and outer ridges 63, 65 formed thereon. As shown in FIG. 11A, the inner and outer segments 47, 48 preferably overlap to a limited extent, and the ridges 63, 65 are positioned in the gaps $G_1$, $G_2$.

Dowel pins (or shoulder screws) 66 protrude from the inner segments 47, and the dowel pins 66 are slidingly receivable in slots 68 in the outer segments 48 (FIG. 3B). When the inner segments 47 are moved radially inwardly or outwardly, the outer segments 48 are also moved in the same direction, due to the dowel pins 66 engaging the sides defining the slots 68 and urging the outer segment 48 to move accordingly. The slots 68 permit lateral movement of the dowel pins 66 therein, allowing partially lateral movement of the outer segments 48 relative to the inner segments 47 to permit radial movement of the inner segments 47, and of the outer segments when the inner segments 47 are moved inwardly or outwardly, due to inward or outward movement of the adjustment elements 26 on which the inner segments 47 are mounted. As can be seen, for instance, in FIG. 1C, due to the overlapping of the inner and outer segments 47, 48 in the curved segments $S_1$, $S_2$, the slip rail assemblies 46 form substantially continuous contact portions 22 (i.e., positioned appropriately) in the curved segments. As will be described, the inner and outer contact surfaces 62, 64 define a substantially continuous contact surface 23 along the curved segment.

From the foregoing, it can be seen that the outer segments 48 move radially with the inner segments 47 due to the connection thereby effected via the dowel pins 66. Accordingly, the contact surfaces 62, 64 are both moved radially substantially simultaneously, and the same distance, due to radial movement of the adjustment elements. The inner and outer contact surfaces 62, 64 therefore remain substantially vertically aligned during radial movement thereof. Accordingly, because the inner and outer segments 47, 48 overlap, and also because of the ridges 63, 65 positioned in the gaps $G_1$ and $G_2$, the inner and outer segments 47, 48 provide substantially continuous contact surfaces 62, 64 in the curved segments. Accordingly, the slip rail assemblies 46 are readily adjustable and, because they provide substantially continuous contact surfaces 62, 64 they are effective to guide the containers in the preselected position therefor as the containers are moved through the curved segment.

As indicated above, when the drive element 28 is rotated, the adjustment elements 26 to which the drive element 28 is connected move the same distance radially, in or out. For instance, as shown in FIG. 3B, the adjustment elements 26 are movable inwardly (schematically indicated by arrow "$E_1$") and outwardly (schematically indicated by arrow "$E_2$"). The spacing between adjustable point devices 24 affects the accuracy of the positioning of the contact portions. In the invention herein, as can be seen, for example, in FIG. 3B, it is preferred that a number or adjustable point devices 24 be located in the curved segment, to provide a number of points for accurately positioning the contact portions 22 (i.e., the slip rail assemblies 46).

In the drawings and in the description, the guide rail system 10 has been described as including two sets of adjustable point devices 24 with contact portions 22 positioned thereby, i.e., one located on each side of the conveyor 14. However, those skilled in the art will appreciate that the system 10 may, for example, include adjustable point devices 24 located along only one side of the conveyor 14. In that arrangement, fixed contact portions would be positioned along the other side of the conveyor 14.

Figure 14A:
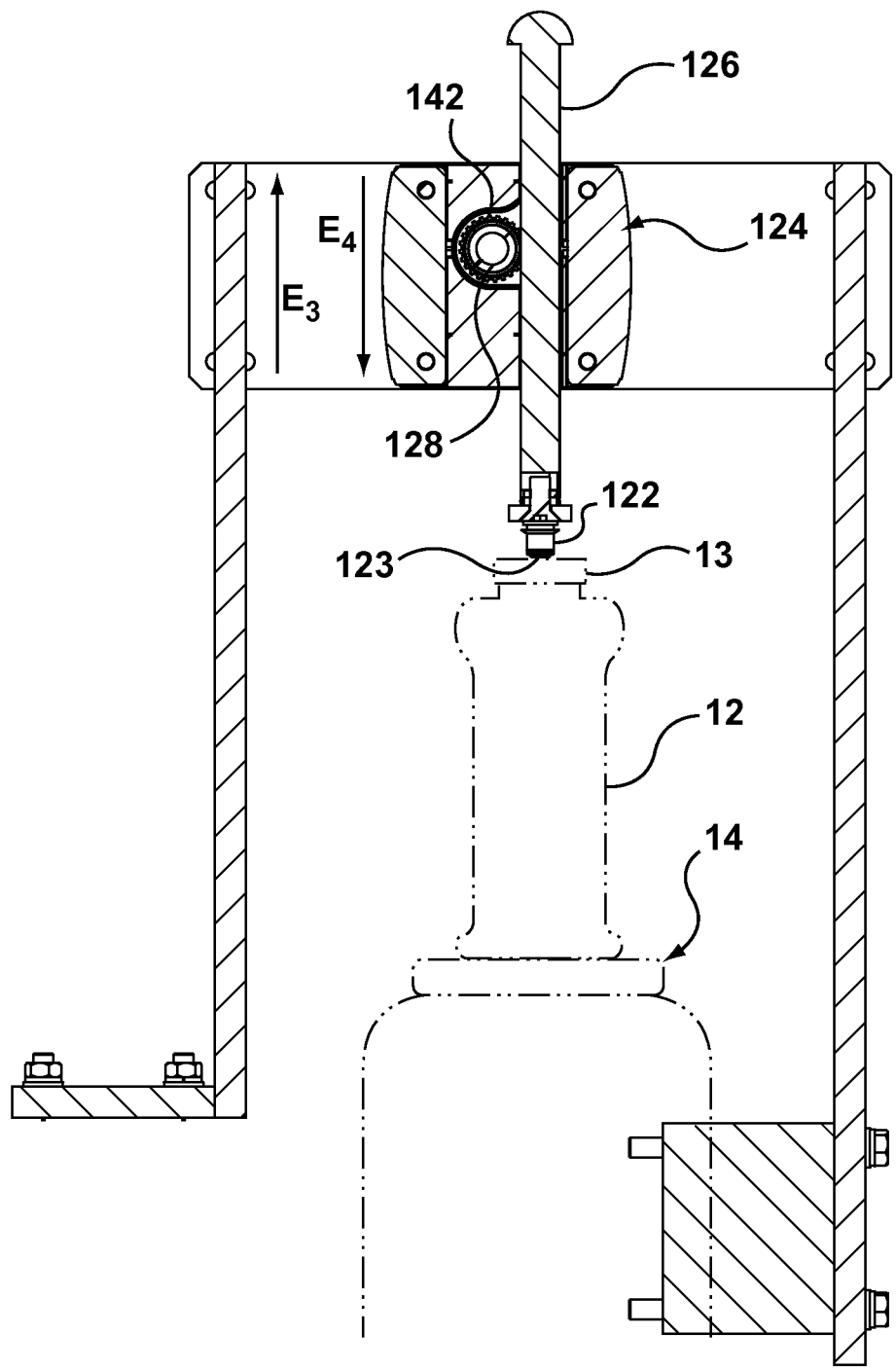
FIG. 14A is a cross-section of an embodiment of a central adjustment point device of the invention, drawn at a larger scale.
Figure 15:
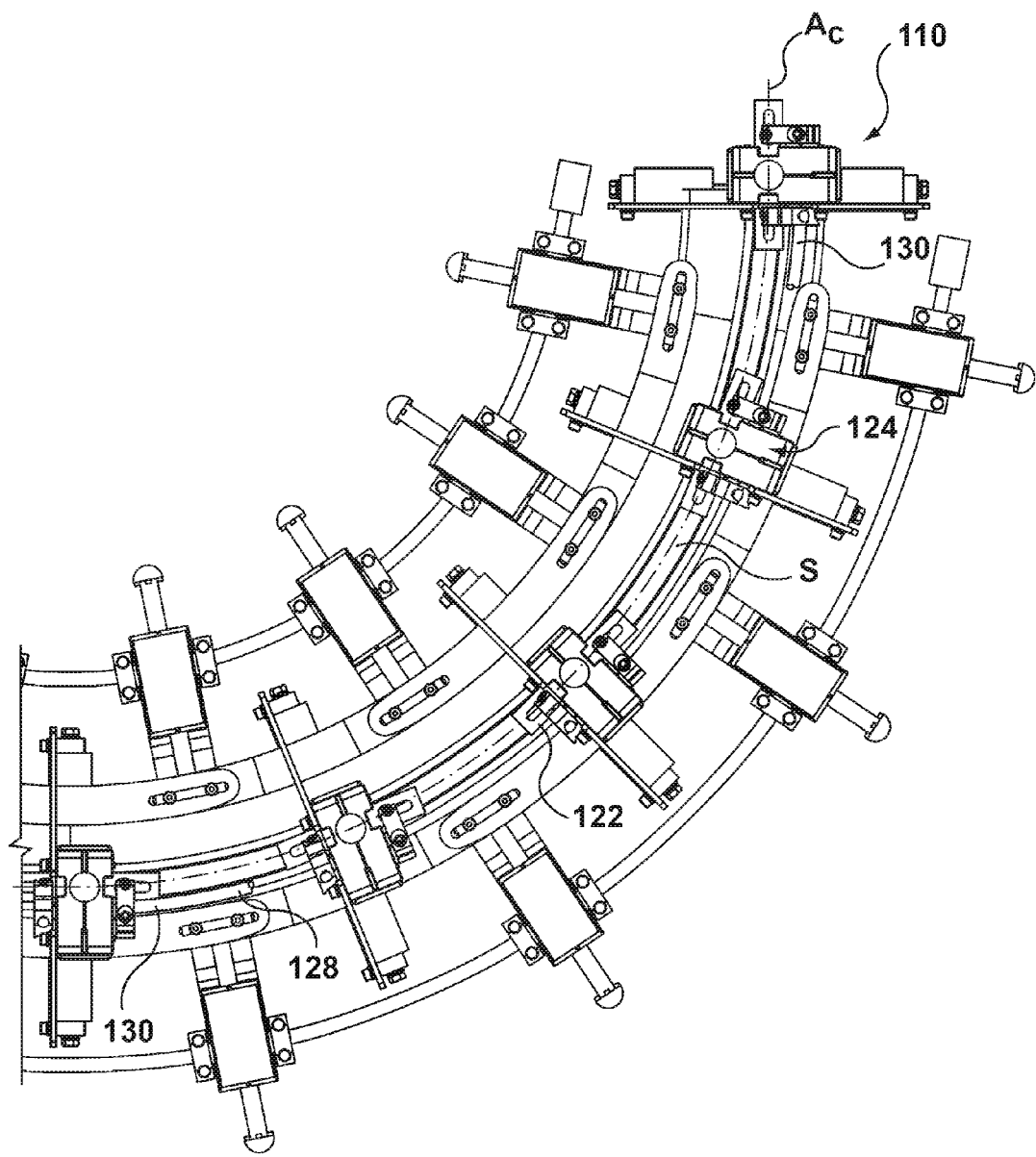
FIG. 15 is a top view of a curved segment of an embodiment of a guard rail system of the invention, drawn at a smaller scale.

In another embodiment, and as can be seen in FIGS. 13A-13F, a guide rail system 110 of the invention preferably includes a number of central contact portions 122 for engaging closures 13 on the containers 12 (FIG. 14A), to at least partially locate the containers 12 in the preselected positions on the conveyor 14. Preferably, the guide rail system 110 includes a number of central adjustable point devices 124 (FIG. 13A), for locating the central contact portions 122 in predetermined central locations respectively relative to the conveyor 14, for engagement with the closures 13 on the containers 12 as the containers 12 are moved past the central contact portions 122 by the conveyor 14. As can be seen in FIG. 14A, each central adjustable point device 124 preferably includes an adjustment element 126 on which one or more of the central contact portions 122 is mounted. It is preferred that the adjustment element 126 is movable relative to the conveyor 14 to position the central contact portion 122 in the predetermined central location therefor. The guide rail system 110 preferably also includes a central drive element 128 connected to the central adjustable point devices 124, to position the adjustment elements 126 for positioning the central contact portion 122 respectively mounted thereon in the predetermined central locations respectively. Preferably, the central drive element 128 includes one or more central flexible shafts substantially aligned with the curved segment. In addition, selected ones of the central adjustable point devices 124 preferably are positioned at preselected central positions spaced apart from each other along the curved segment S (FIG. 15). The central flexible shaft 130 preferably is connected to the selected ones of the central adjustable point devices 124 respectively, to position the central contact portions 122 mounted thereon in the preselected central locations therefor.

Preferably, the central contact portions 122 mounted on the selected ones of the central adjustable point devices 124 substantially define a central arc $A_c$ (FIG. 15) which is substantially aligned with the curved segment. It is preferred that the central contact portions 122 mounted on the selected ones of the central adjustable point devices 124 overlap with each other to provide one or more substantially continuous central surfaces 123 (FIG. 14A) for engagement thereby with the closures 13 on the containers 12, as the containers 12 are moved along the curved segment S.

From the foregoing, it can be seen that the central adjustable point devices 124 provide another means for positioning the container 12 in the preselected position relative to the conveyor 14. The contact surface 123 of the contact portion 122 is designed, when properly positioned, to slidingly engage the closure 13 on the container 12 to the appropriate extent, i.e., to at least partially locate the containers in the preselected position relative to the conveyor 14.

It will be understood that the central adjustment point devices 124, although generally positioned between (and vertically offset from) the contact portions 22, are not necessarily positioned midway between the contact portions 22. The lateral and vertical positioning of the central adjustment point devices 124 is determined by the container, the conveyor, and the preselected position relative to the conveyor.

As can be seen in FIG. 14A, the central drive element 128 preferably is secured to a pinion 142, and rotation of the central drive element 128 results in substantially vertical movement of the rack, i.e., the adjustment element 126. As illustrated in FIG. 14A, movement of the adjustment element 126 may be up (schematically illustrated by arrow "E3" in FIG. 14A) or down (schematically illustrated by arrow "E4").

As can be seen in FIG. 15, the central adjustable point devices 124 are mountable in a curved segment "$S_3$". In this situation, it will be understood that the central drive element 128 includes a flexible shaft 130. (For clarity of illustration, only parts of the flexible shaft 130 are shown in FIG. 15.) Accordingly, rotation of the flexible shaft 130 results in substantially simultaneous vertical movement of the adjustment elements 126 in the curved segment $S_3$ by substantially the same distance. The guide rail system 110 is thus adapted for rapid adjustment to different containers and closures. Positioning a number of central adjustable point devices 124 in the curved segment S₃ results in accurate positioning of the contact portions 122.

In another alternative embodiment, a guide rail system 210 of the invention preferably includes a number of contact portions 222, for engaging the containers 12 to at least partially locate the containers 12 in preselected positions on the conveyor 14, and a number of adjustable point devices 224 to locate the contact portions 222 in predetermined locations respectively relative to the conveyor 14, for engagement thereby with the containers 12 as the containers are moved past the contact portions 222 by the conveyor 14. Each adjustable point device 224 preferably includes an adjustment element 226 on which one or more of the contact portions 222 is mounted, the adjustment element 226 being movable relative to the conveyor 14 to position the contact portion 222 mounted thereon in the predetermined location therefor. Preferably, the guide rail system 210 also includes a drive element 228 connected to the adjustable point devices 224 to position the adjustable elements 226 for locating the contact portions 22 respectively mounted thereon in the predetermined locations respectively. It is also preferred that the guide rail system 210 includes a gear train 250 for rotating the drive element 228, the gear train 250 being adapted for resisting movement initiated at the drive element 228.

Figure 4C:
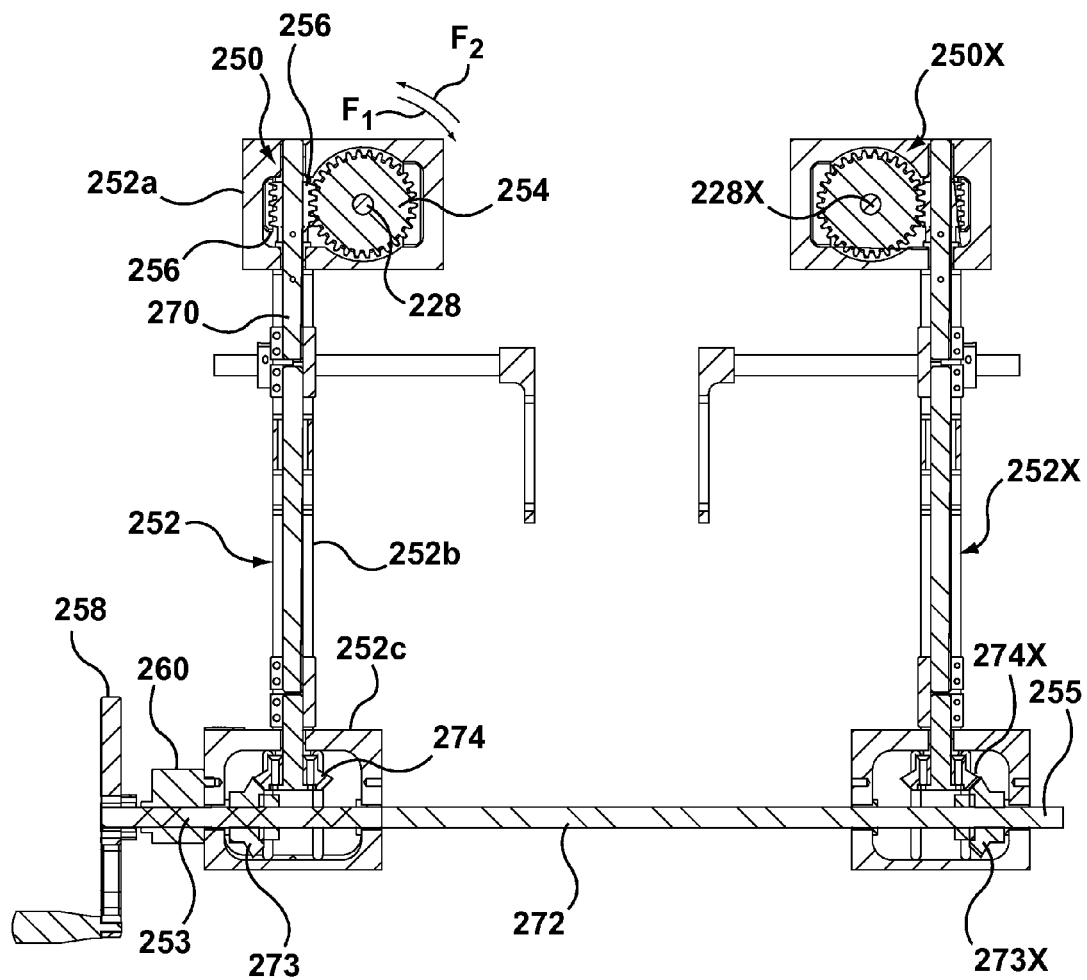
FIG. 4C is a cross-section of an embodiment of a gear train of the invention, drawn at a smaller scale.
Figure 8:
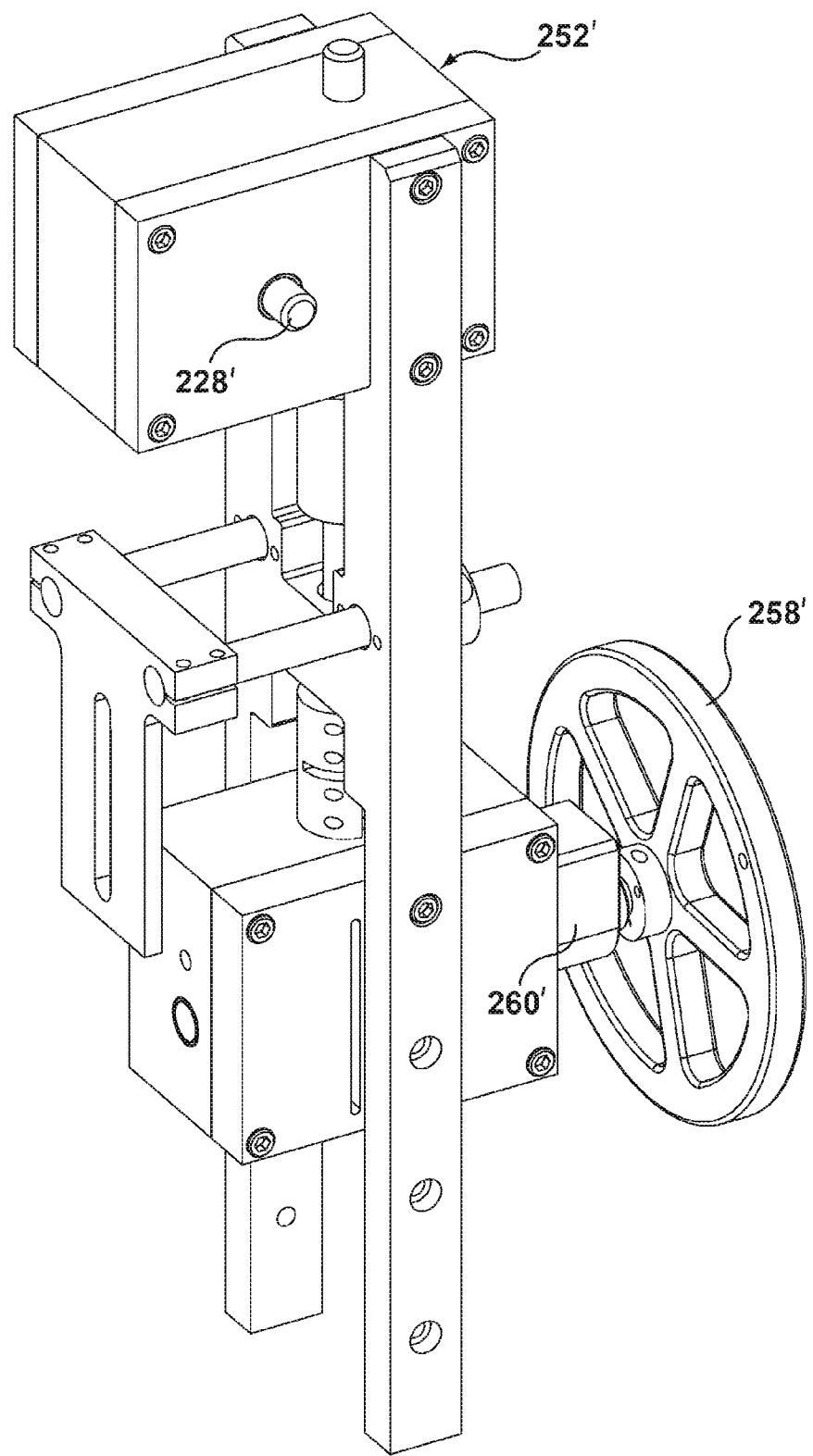
FIG. 8 is an isometric view of an embodiment of a gearbox of the invention, drawn at a smaller scale.
Figure 9:
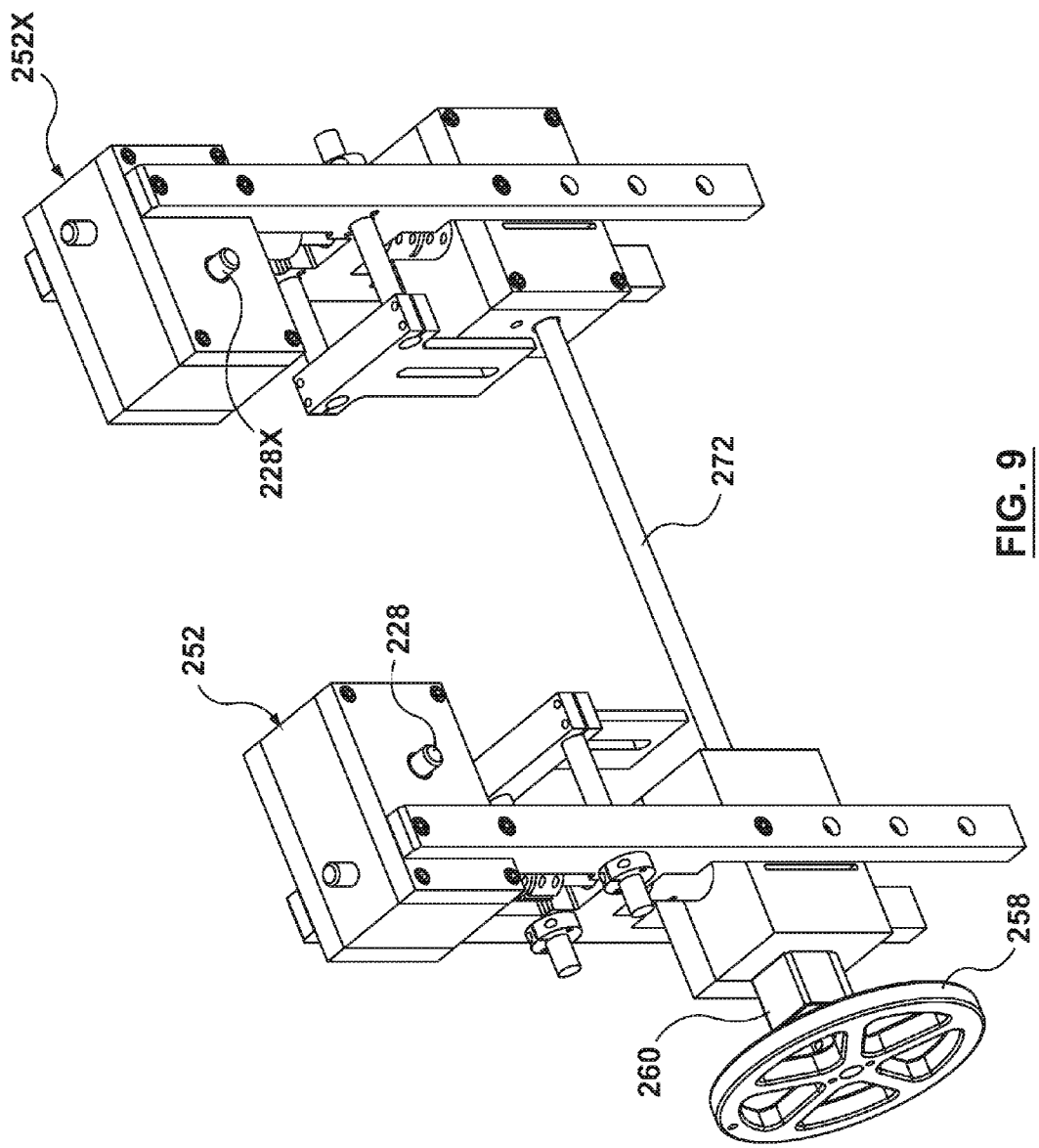
FIG. 9 is an isometric view of an alternative embodiment of the gearbox of the invention, drawn at a smaller scale.

Preferably, the gear train 250 includes a gear box 252, a driven gear 254 rotatably mounted in the gear box 252 and operably connected to the drive element 228, and a drive gear 256 rotatably mounted in the gear box 252 and drivably coupled to the driven gear 254. The gear box 252 preferably also includes a driving element 258 drivably coupled to the drive gear 256, for driving the drive gear 256. The driven gear 254 and the drive gear 256 preferably have a gear ratio which provides a mechanical advantage to driving the drive gear 256 with the driving element 258 so that the driven gear 254 resists rotational movement thereof initiated at the drive element 228. In one embodiment, the driving element 258 is a manually operated crank journaled in the gear box 252 (FIGS. 4C, 8, 9). Preferably, the gear ratio for the driven gear 254 and the drive gear 256 is any gear ratio providing a mechanical advantage.

As can be seen in FIG. 4C, the drive gear 256 preferably is a worm gear, positioned on a first shaft 270. The driven gear 254 is secured to the drive element 228. Accordingly, it can be seen that rotation of the shaft 270 results in rotation of the shaft, in the direction indicated by arrow "$F_1$" or, alternatively, in the direction indicated by arrow "$F_2$". The gearbox 252 includes sub-elements thereof identified for convenience in FIG. 4C as 252a, 252b, and 252c.

The gear train 250 illustrated in FIG. 4C is for substantially simultaneous rotation of drive elements 228 positioned along both sides of the conveyor 14, e.g., as shown in FIGS. 1A-1C. In one embodiment, the gear train 250 preferably includes the crank 258, connected to a second shaft 272. The first and second shafts 270, 272 preferably are operatively connected by bevel gears 273, 274, so that rotation of the second shaft 272 (e.g., initiated by manual rotation of the crank 258) results in substantially simultaneous rotation of the first shaft 270. As noted above, rotation of the first shaft 270 in turn results in substantially simultaneous rotation of the drive element 228.

As described above, the driven gear 254 and the drive gear 256 preferably have a gear ratio which provides a mechanical advantage to driving the drive gear 256 with the driving element 258, so that the driven gear 254 resists rotational movement thereof initiated at the drive element 228. There are therefore two advantages resulting from the gear train 250. First, it provides a mechanical advantage to the user. Second, because of the gear train 250, rotational movement of the driven gear which is initiated at the drive element 228 is resisted, i.e., there is a great deal of resistance to overcome. (This is particularly true where, as is preferably the case, the drive gear 256 is a worm gear.)

Those skilled in the art will appreciate that, because the containers constantly bump against the contact portions as they move past the contact portions, in the prior art, the contact portions are sometimes moved out of position over time, due to such bumping. Accordingly, the second advantage noted above is very significant, because it means that the contact portions 222 in the system 210 of the invention are unlikely to be moved out of position. Although the guide rail system 210 may include a brake (not shown) to prevent unintentional rotational movement of the drive element, the brake is not required in most applications, if an appropriate gear ratio is used.

Those skilled in the art will also appreciate that the gear ratio may be within a broad range (e.g., between 10:1 and 50:1) depending on various factors, e.g., fineness of adjustment required, and length of drive. In one embodiment, the gear ratio is 30:1. Due to the 30:1 ratio, relatively fine adjustment of the position of the drive element 228 relative to the conveyor is possible. Preferably, repeatability is provided via a counter 260 (FIGS. 4C, 9) operably connected to the driving element 258, as is known in the art.

As illustrated in FIG. 4C, gear trains are provided for drive elements on both sides of the conveyor, both driven by the same driving element 258. Only one gear train on one side of the conveyor is described in detail, as the other gear train (identified in FIG. 4C for convenience as 250X) is the same, in all material respects.

As can be seen in FIG. 4C, the second shaft 272 preferably extends between a proximal end 253 and a distal end 255. The proximal end 253 is connected to the driving element 258, so that rotation of the driving element 258 results in rotation of the second shaft 272. At the distal end 255, the second shaft 272 is operatively connected to another first shaft 270X by bevel gears 273X, 274X. Accordingly, rotation of the driving element 258 results in rotation of the drive elements 228, 228X to the same extent, and in opposite directions. For instance, when the drive element 228 is rotating in a clockwise direction (i.e., causing adjustment elements connected thereto to move inwardly by a certain distance), the drive element 228X rotates in a counterclockwise direction (i.e. causing adjustment elements connected thereto to move inwardly by the same distance), and vice versa. It can be seen, therefore, that the arrangement shown in FIGS. 4C and 9, in which gear trains on both sides of the conveyor are connected for inward and outward movement by the same distance, is advantageous because the user (not shown) can adjust the contact portions 22 on both sides of the conveyor by controlling one driving element 258.

The gear box 252 is shown in FIG. 9. The conveyor is omitted from FIG. 9 to simplify the illustration.

As noted above, the system 10 may provide for adjustment of the positions of the contact portions 22 on only one side of the conveyor 14. That is, it may be advantageous for the system 10 to have the contact portions along one side of the conveyor fixed in position, with only the contact portions on the other side of the conveyor fixed in position, with only the contact portions on the other side of the conveyor being adjustable. The gearbox 252' illustrated in FIG. 8 includes a gear train (not shown in FIG. 8) adapted for changing the positions of contact portions along one side of the conveyor. The user causes rotation of the drive element 228' by rotating the driving element 258', to adjust the positions of the contact portions which are indirectly (via adjustment elements) connected to the drive element 228'. A counter 260' preferably is provided, for repeatability.

In another embodiment, a guide rail system 310 of the invention additionally includes a number of central contact portions 322 for engaging closures 13 on the containers 12, to at least partially locate the containers 12 in the preselected positions on the conveyor 14. The guard rail system 310 also includes a number of central adjustable point devices 324, for locating the central contact portions 322 in predetermined central locations respectably relative to the conveyor 14, for engagement thereby with the closures 13 on the containers 12 with the containers 12 are moved past the central contact portions 322 by the conveyor. Each central adjustable point device 324 includes an adjustment element 326 on which one or more of the central contact portions 322 is mounted, the adjustment element 326 being movable relative to the conveyor 14 to position the central contact portion 322 mounted thereon in the predetermined central location therefor. The guard rail system 310 also includes a central drive element 328 connected to the central adjustable point devices 324 to position the adjustable adjustment elements 326 for locating the central contact portions 322 respectively mounted thereon in the predetermined central locations respectively. Also, the guard rail system 310 preferably includes a central gear train 350 for rotating the central drive element 328, the central gear train 350 being adapted for resisting movement initiated at the central drive element 328.

The central gear train 350 preferably includes a central gear box 352, a central driven gear 354 rotatably mounted in the central gear box 352 and operably connected to the central drive element 328, and a central drive gear 356 rotatably mounted in the central gear box 352 and drivably coupled to the central driven gear 354. Also, the central gear train 350 preferably includes a central driving element 358 drivably coupled to the central drive gear 356, for driving the central drive gear 356. The central driven gear 354 and the central drive gear 356 have a central gear ratio providing an mechanical advantage to driving the central drive gear 356 with the driving element 358 so that the central driven gear 354 resists rotational movement thereof initiated at the central drive element 328.

Preferably, the central driving element 358 is a manually-operated crank journaled in the central gear box 352. It is preferred that the central gear ratio for the central driven gear 354 and the central drive gear 356 is any gear ratio that provides a mechanical advantage.

The guide rail system 310 is illustrated in FIGS. 13A-13F, mounted on a conveyor on which the guide rail system 210 is also mounted. Although the guide rail system 310 is shown in FIGS. 13A-13F with the guide rail system 210, it will be understood that the two embodiments of the guide rail system shown in FIGS. 13A-13F may be used separately, as well as together. For example, the guide rail system 310 is also shown alone, in FIG. 14C.

Figure 14B:
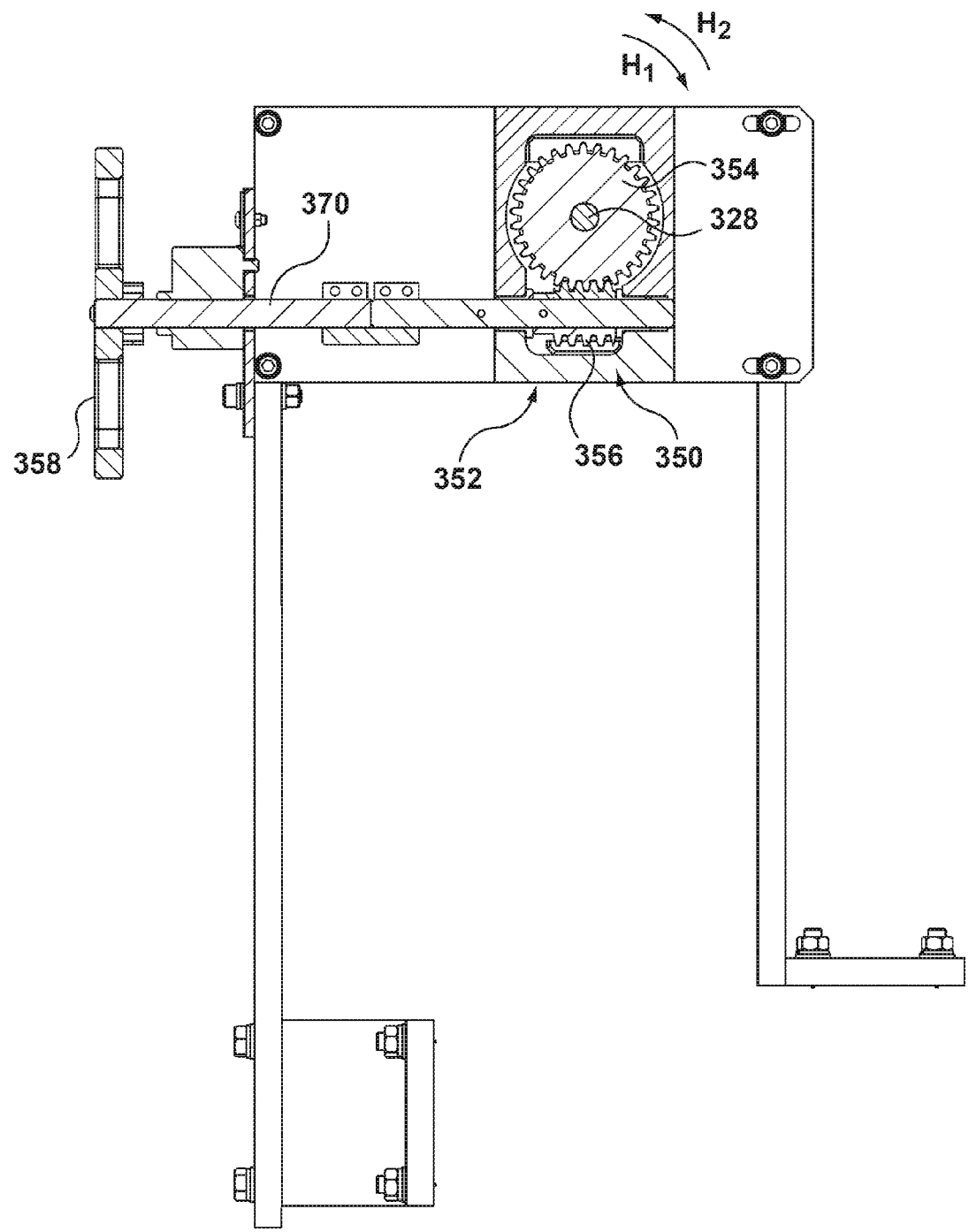
FIG. 14B is a cross-section of an embodiment of a central gear train of the invention.
Figure 14C:
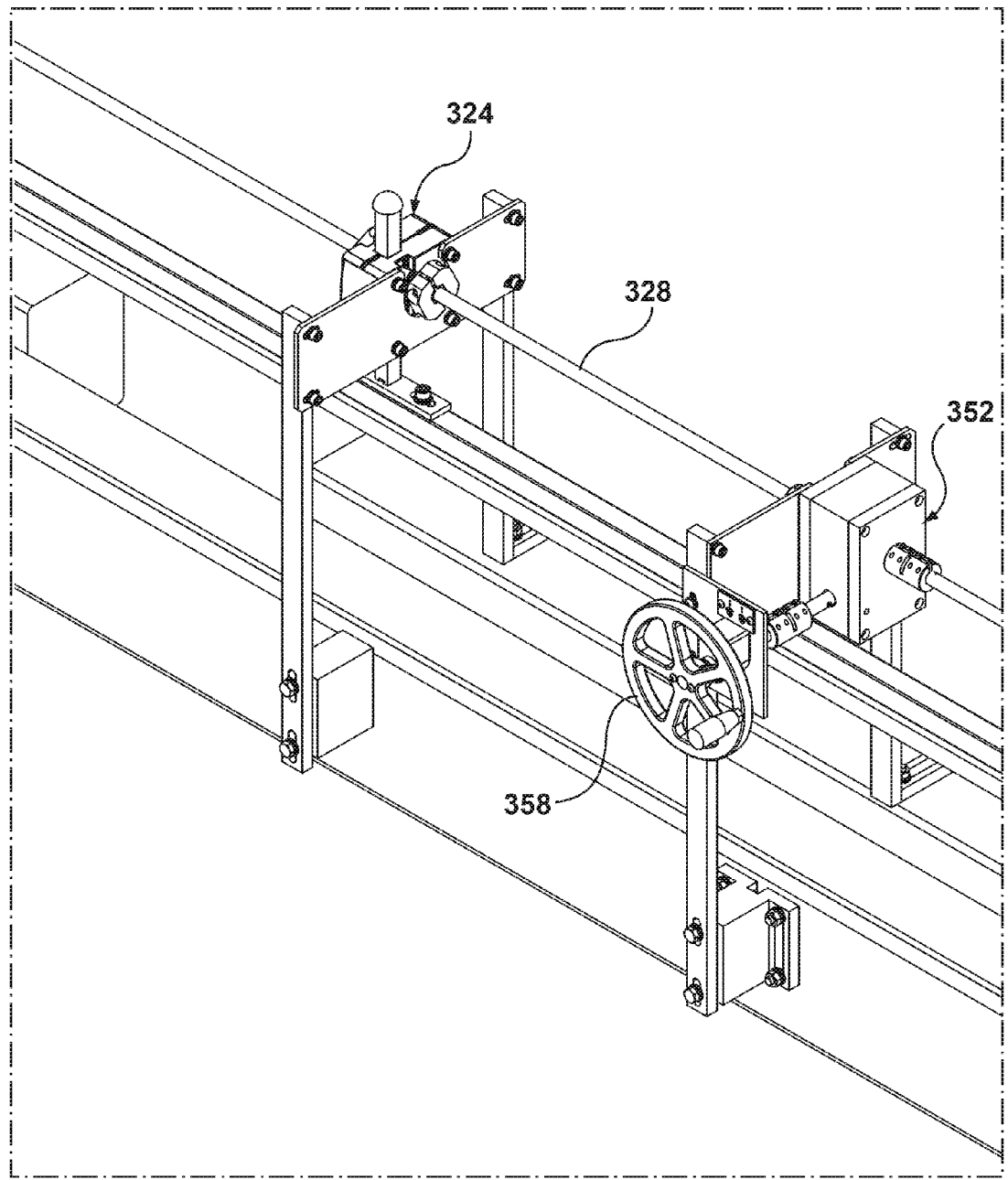
FIG. 14C is an isometric view of another embodiment of a guide rail system of the invention, drawn at a smaller scale.

The gear train 350 is shown in FIG. 14B. As can be seen in FIG. 14A, the drive gear 356 preferably is a worm gear, positioned on a shaft 370. The driven gear 354 is secured to the central drive element 328. Accordingly, it can be seen that rotation of the shaft 370 results in rotation of the shaft, in the direction indicated by arrow "$H_1$" or, alternatively, in the direction indicated by arrow "$H_2$".

As described above, the driven gear 354 and the drive gear 356 preferably have a gear ratio which provides a mechanical advantage to driving the drive gear 356 with the driving element 358, so that the driven gear 354 resists rotational movement thereof initiated at the drive element 328. There are therefore two advantages resulting from the gear train 350. First, it provides a mechanical advantage to the user. Second, because of the gear train 350, rotational movement of the driven gear which is initiated at the drive element 328 is resisted, i.e., there is a great deal of resistance to overcome. (This is particularly true where, as is preferably the case, the drive gear 356 is a worm gear.)

As noted above, because the containers constantly bump against the central contact portions as they move past the central contact portions, in the prior art, the central contact portions are sometimes moved out of position over time, due to such bumping. Accordingly, the second advantage noted above is very significant, because it means that the contact portions 322 in the system 310 of the invention are unlikely to be moved out of position. Although the guide rail system 310 may include a brake (not shown) to prevent unintentional rotational movement of the drive element, the brake is not required in most applications, if an appropriate gear ratio is used.

Those skilled in the art will appreciate that the gear ratio may be within a broad range (e.g., between 10:1 and 50:1) depending on various factors, e.g., fineness of adjustment required, and length of drive. In one embodiment, the gear ratio is 30:1. Due to the 30:1 ratio, relatively fine adjustment of the position of the drive element 328 relative to the conveyor is possible. Preferably, repeatability is provided via a counter 360 (FIG. 8) operably connected to the driving element 358, as is known in the art.

Figure 16:
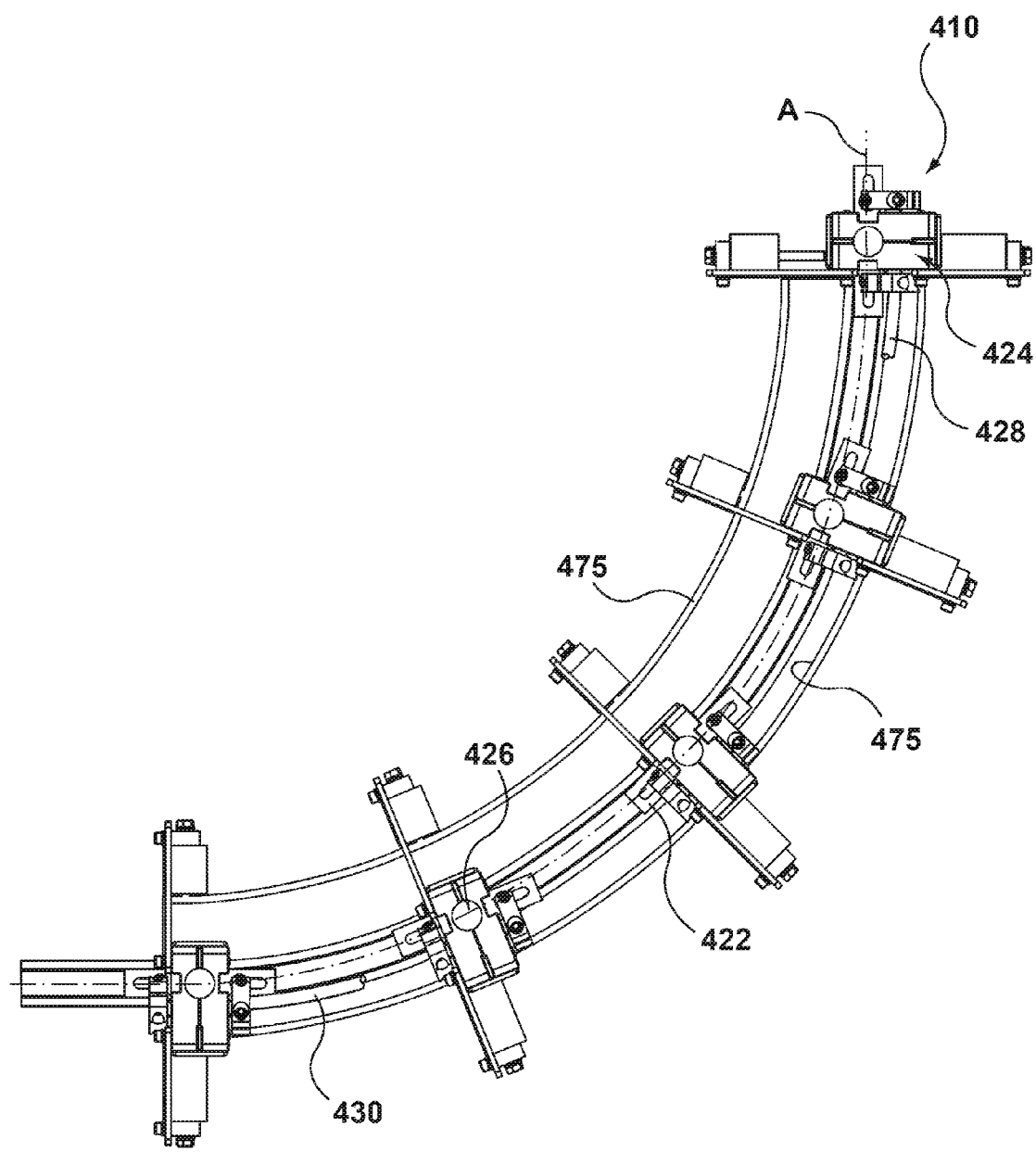
FIG. 16 is a top view of a curved segment of another embodiment of a guard rail system of the invention.

An alternative embodiment of a guide rail system 410 of the invention is illustrated in FIG. 16. The guide rail system 410 is for guiding containers 12 moved by the conveyor 14. The conveyor 14 at least partially defines the path 16 along which the containers 12 are moved thereby. The guide rail system 410 preferably includes a number of central contact portions 422, for engaging the closures 13 on the containers 12, to at least partially locate the containers 12 in the preselected positions on the conveyor 14, and a number of central adjustable point devices 424, for locating the central contact portions 422 in predetermined locations respectively relative to the conveyor 14, for engagement with the closures 13 on the container 12 as the containers 12 are moved past the central contact portions 422 by the conveyor 14. Preferably, each of the central adjustment point devices 424 includes an adjustment element 426 on which one or more of the central contact portions 422 is mounted, the adjustment element 426 being movable relative to the conveyor 14 to position the central contact portion 422 in the predetermined central locations therefor. The guide rail system 410 preferably also includes a central drive element 428 connected to the central adjustable point devices 424 and movable to position the adjustment elements 426 for positioning the central contact portions 422 respectively mounted there on in the predetermined central locations respectively. The path 16 includes the curved segment S at least partially defining an arc A. The central drive element 428 includes one or more flexible central shafts 430 substantially aligned with the curved segment S. Selected ones of the central adjustable point devices 424 are positioned at preselected central positions spaced apart from each other along the curved segment S. The flexible central shaft 430 is connected to the selected ones at the central adjustable point devices 424 respectively, to position the central contact portions 422 mounted thereon in the predetermined central locations therefor.

As can be seen in FIG. 16, the guide rail system 410 of the invention does not include adjustable point devices for horizontal adjustment of contact portions. Instead, the contact portions 475 which are for engaging the sides of the containers are fixed in position. It will be understood that only parts of the flexible shaft 430 are shown in FIG. 16, for clarity of illustration.

Those skilled in the art will be aware that the conveyor and the guide rail system may be floor- or ceiling-mounted. If the conveyor is floor-mounted, then the second shaft 272 preferably is positioned underneath the conveyor 14. If the conveyor is ceiling-mounted, then the second shaft 272 preferably is positioned above the conveyor.

Figure 12:
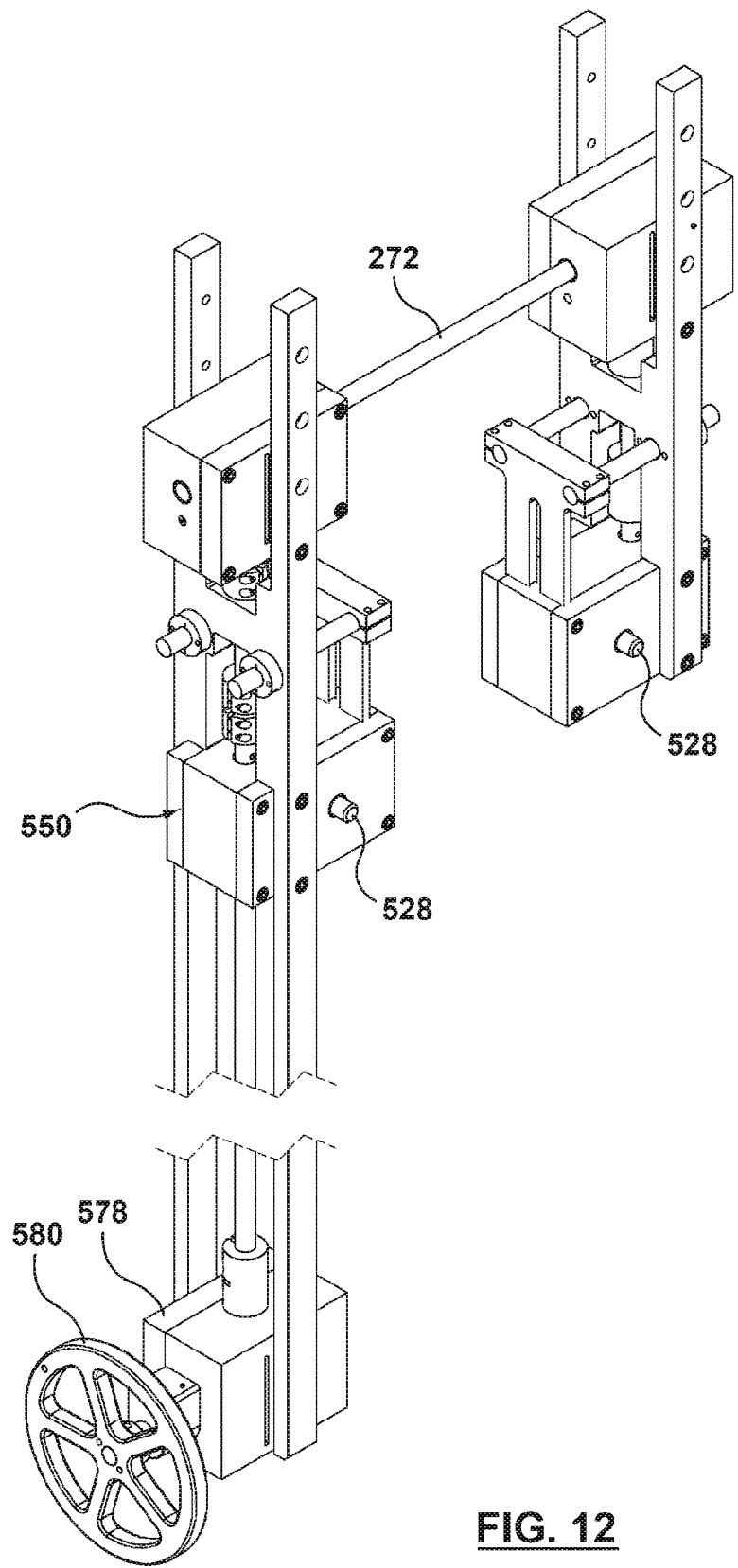
FIG. 12 is an isometric view of an alternative embodiment of the gearbox of the invention.
Figure 13A:
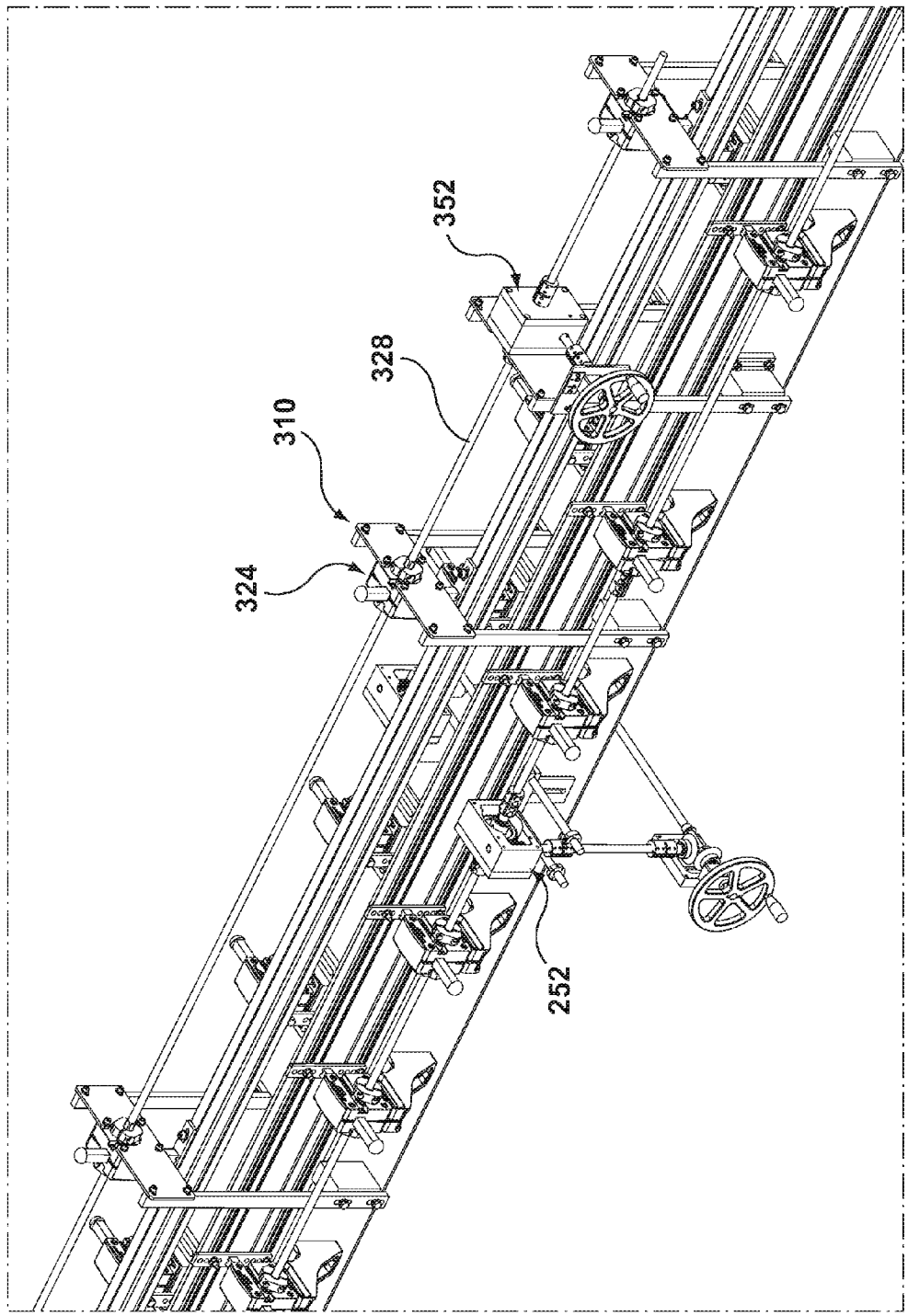
FIG. 13A is an isometric view of a straight segment of another alternative embodiment of the guide rail system of the invention, drawn at a smaller scale.
Figure 13B:
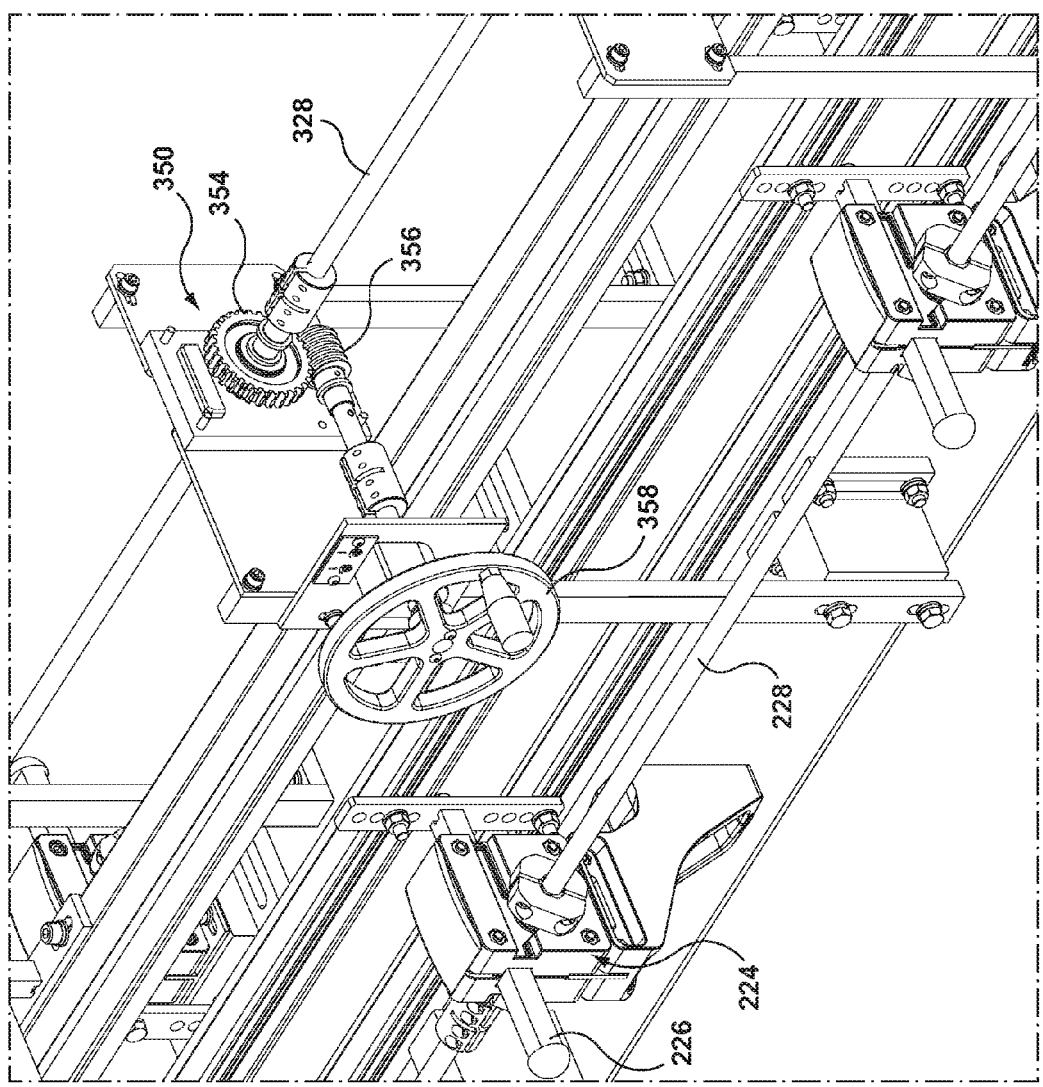
FIG. 13B is an isometric view of an embodiment of a central gearbox of the invention included in the guide rail system of FIG. 13A and other parts thereof, drawn at a larger scale.
Figure 13C:
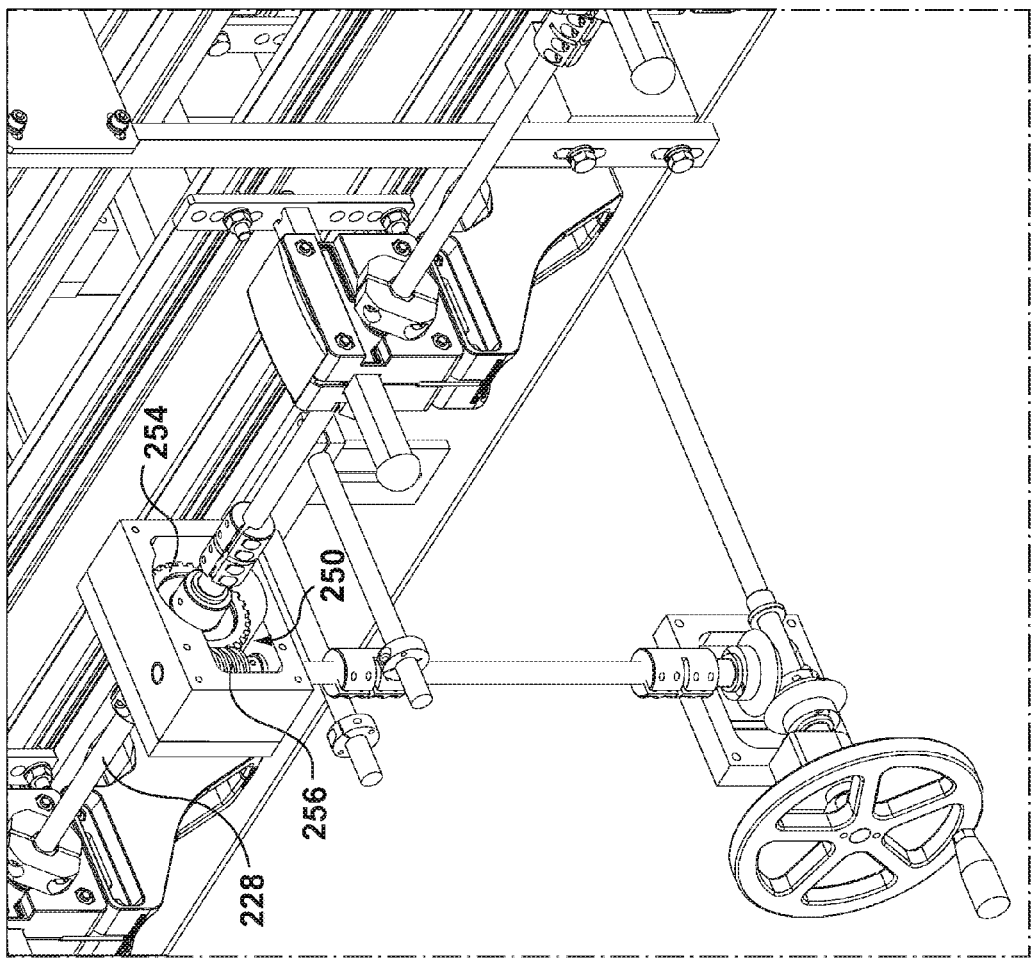
FIG. 13C is an isometric view of a gearbox of the guide rail system of FIG. 13A and other parts thereof.
Figure 13D:
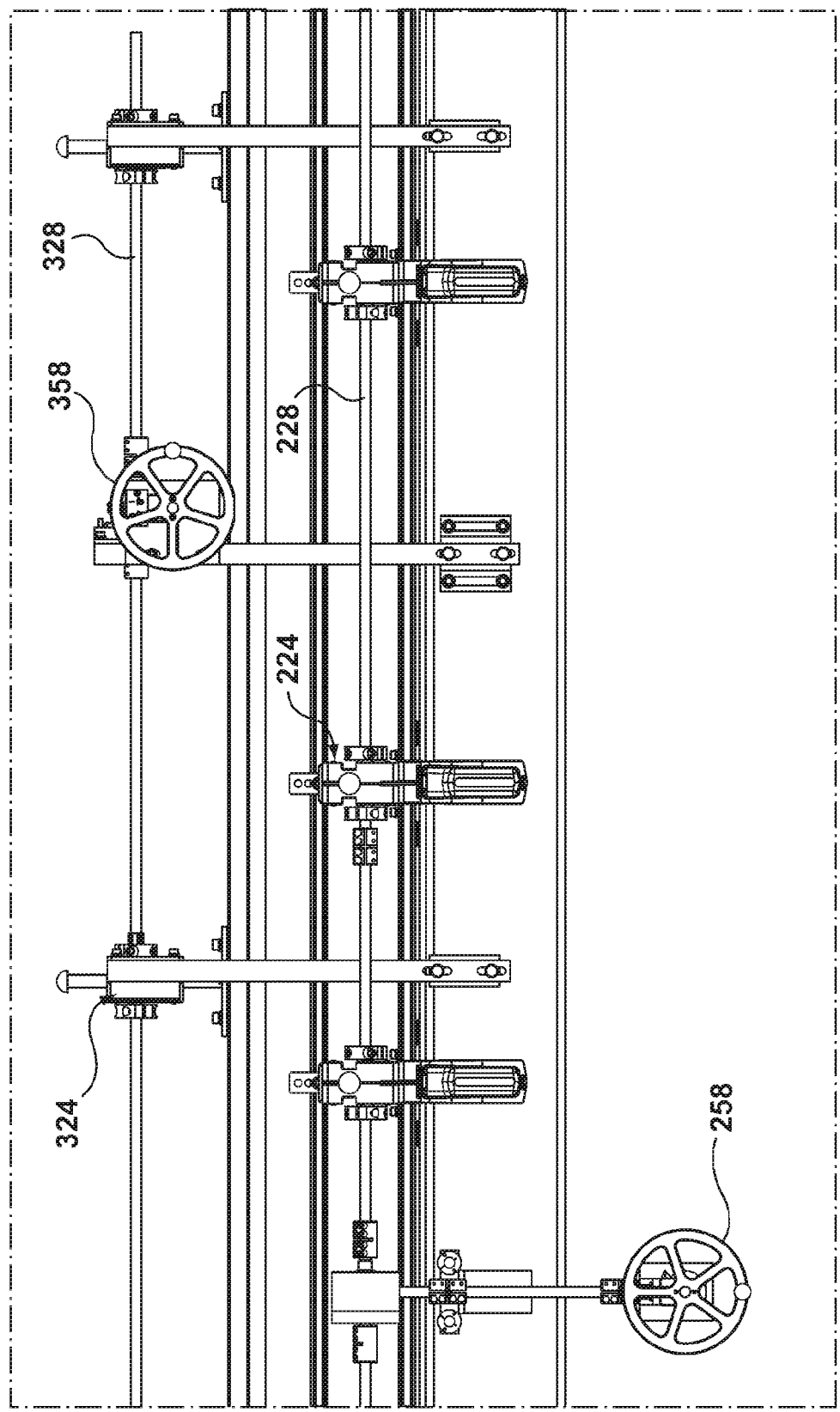
FIG. 13D is a side view of the guide rail system of FIG. 13A.
Figure 13E:
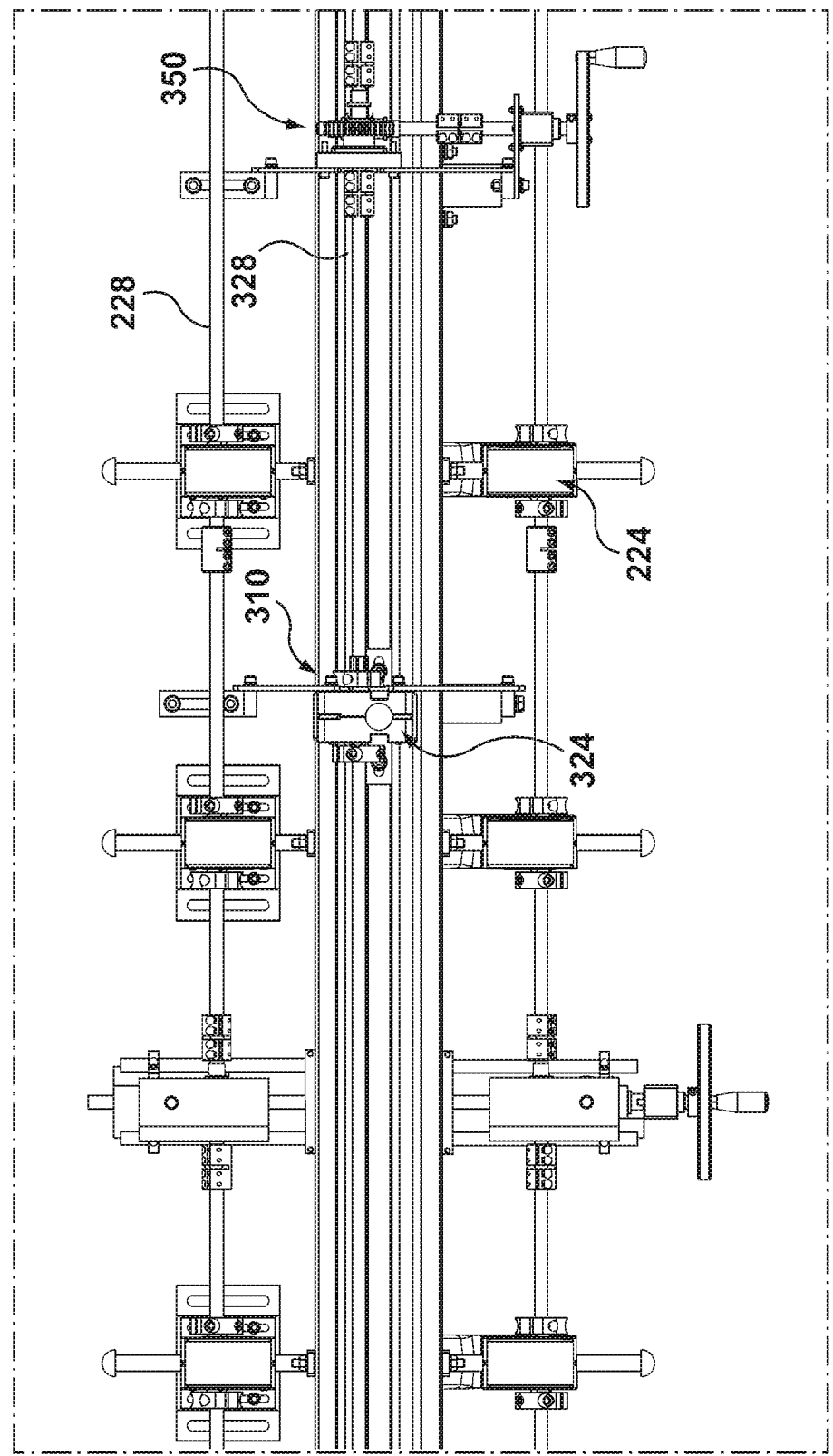
FIG. 13E is a plan view of the guide rail system of FIG. 13D.
Figure 13F:
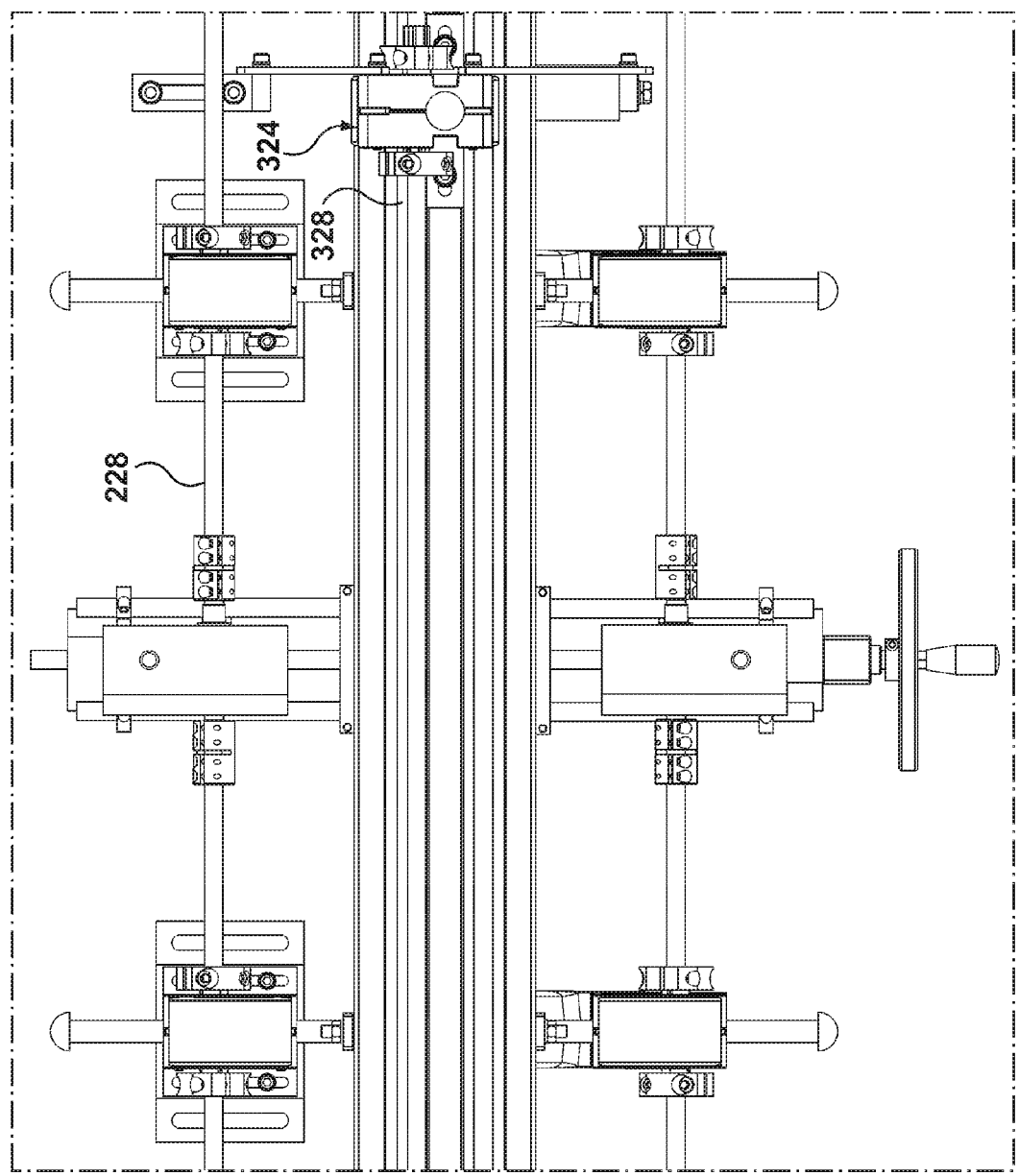
FIG. 13F is another plan view of the guide rail system of FIG. 13D, drawn at a larger scale.

When the conveyor is ceiling-mounted, a transition gearbox 578 (preferably with a 1:1 ratio) preferably is positioned proximal to the floor with a hand wheel 580 attached thereto (FIG. 12). This arrangement is preferred for easy access to a hand wheel in these circumstances. Those skilled in the art will appreciate that the transition gearbox 578 is operatively connected to the gear train 550 which is similar to the gear train 250 described above and shown in FIG. 4C, to effect rotation of the drive elements 528.

As can be seen in FIG. 5A, the adjustable point device 24 preferably includes a slot 82 in its housing 83 for mounting the drive element 28. The adjustable point device 24 preferably is operable whether in an upright position (as shown in FIG. 4A) or in an inverted position. The adjustable point device 24 preferably includes a removable cap portion 84 retainable at an end of the housing in a captured fit when a slot 82a at such end of the housing is not required to be used.

The adjustable point device 24 is shown mounted on the support bracket 36 in FIG. 5A. The support bracket 36 preferably is mounted to the skirt, or base, of the conveyor (not shown). As can be seen in FIG. 5A, a connector element 85 preferably includes flat portions 86, 87 which are receivable in the slot 82 and a slot 88 in the support bracket 36 respectively. The connector element 85 includes holes (not shown) in the flat portions 86, 87. Once inserted in the slots 82, 88, the connector element 85 is secured to the adjustable point device 24 and the support bracket 36 by fasteners (not shown) inserted through holes 89a-89d provided for the purpose and through the aligned holes in the connector element 85, so that the adjustable point device 24 is thereby held in position relative to the support bracket 36. As shown in FIG. 5A, the connector element preferably also includes one or more orthogonal portions 90 for positioning the adjustable point device 24 relative to the support bracket 36.

Figure 6:
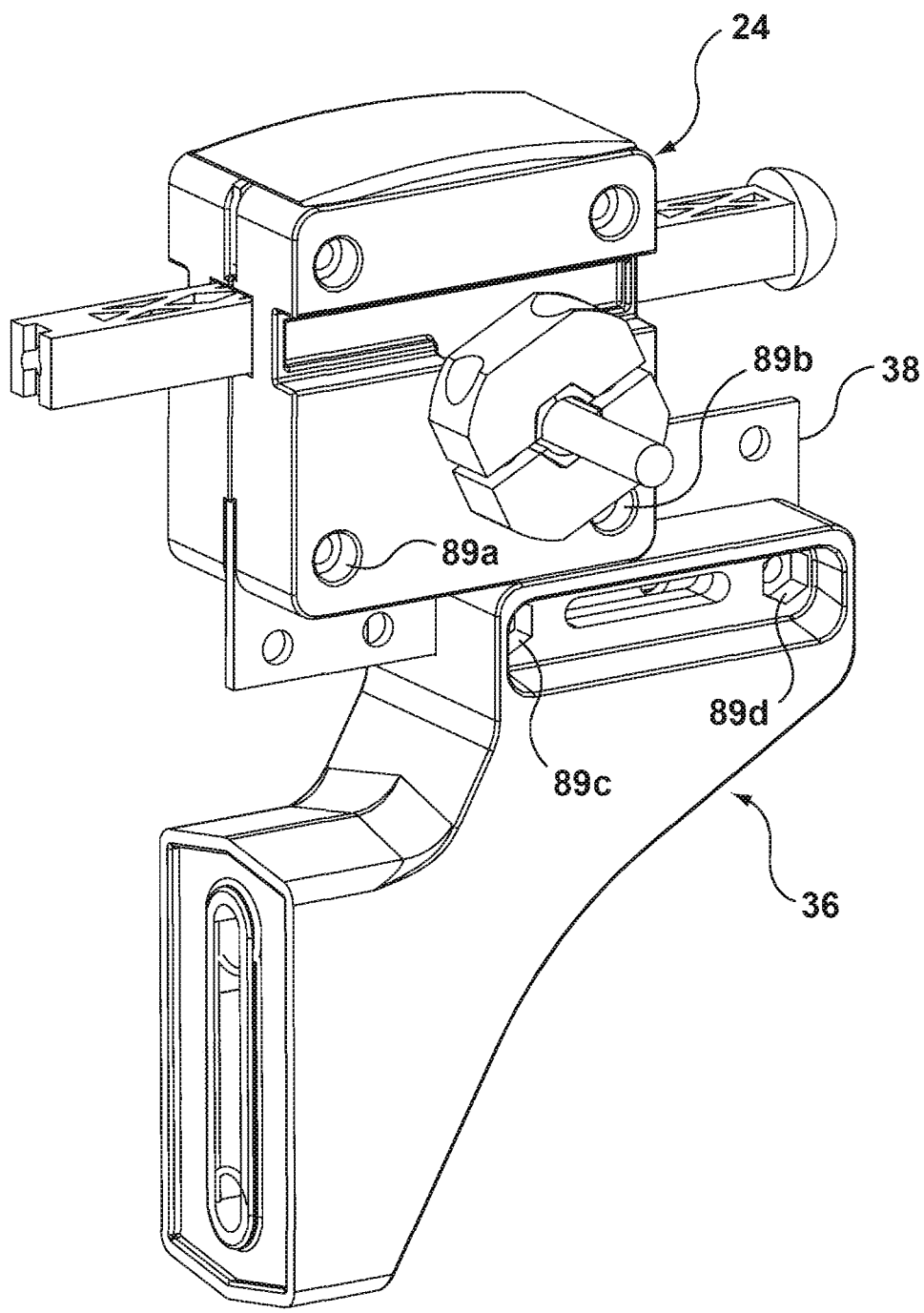
FIG. 6 is an isometric view of the adjustable point device of FIG. 4A mounted offset to the support bracket, drawn at a larger scale.

As can be seen in FIG. 6, the plate 38 may be used to mount the adjustable point device 24 in an offset position relative to the support bracket 36. This may be required where, for example, the contact portion (not shown in FIG. 6) is required to be located relatively far inwardly relative to the conveyor (not shown in FIG. 6). Preferably, the plate 38 is secured to the adjustable point device 24 and the support bracket 36 by fasteners (not shown) through holes 89a-89d.

Figure 7:
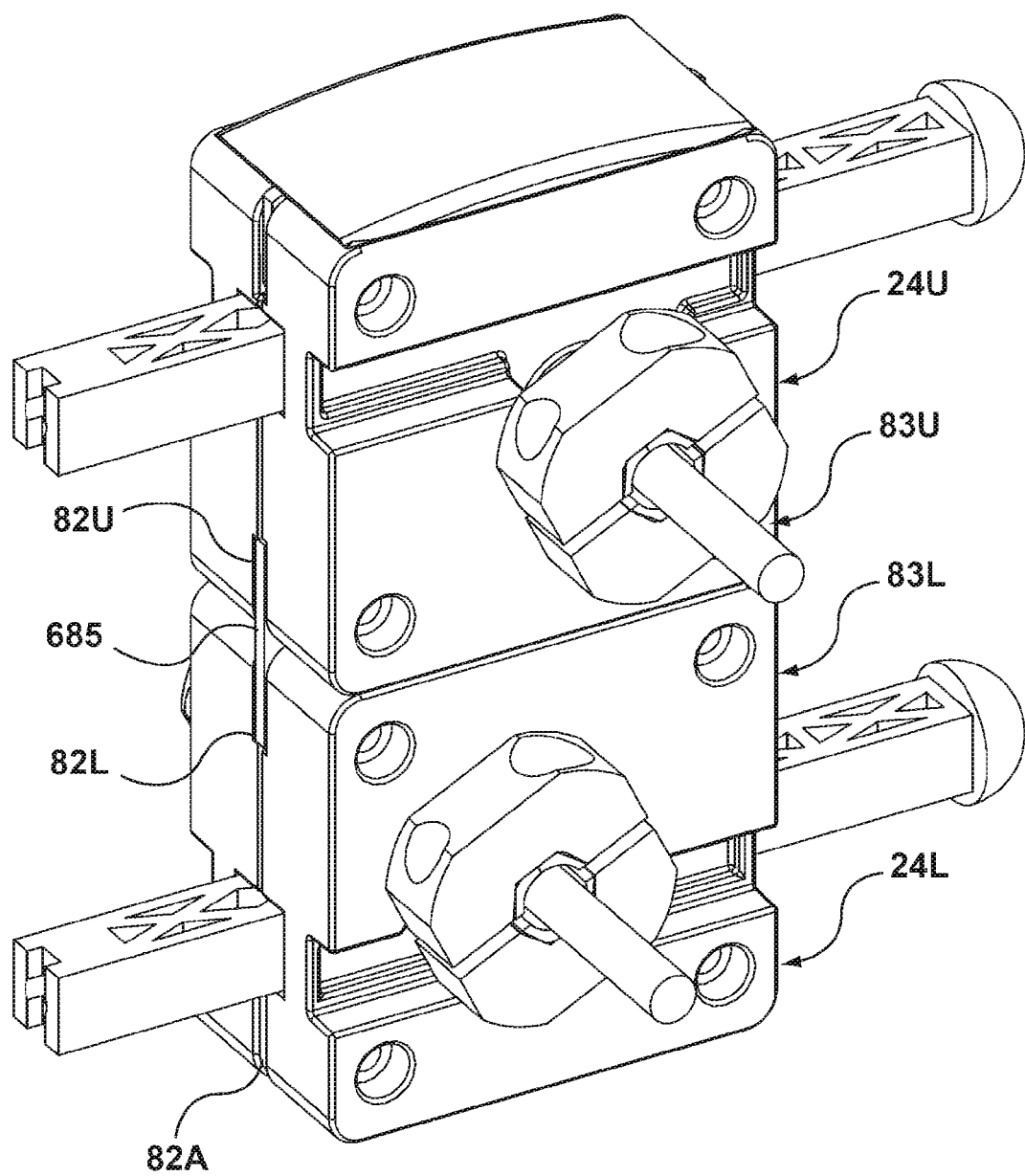
FIG. 7 is an isometric view of an alternative mounting arrangement of the adjustable point devices of the invention, drawn at a larger scale.

As can be seen in FIG. 7, two adjustable point devices (identified for convenience in FIG. 7 as 24U and 24L) may be joined together using an alternative embodiment of the connector element 685. In this arrangement, the connector element 685 is received in slots 82U, 82L in the housings 83U, 83L. The connector element 685 is secured to the housings 83U, 83L by fasteners in the holes provided in the housings for the purpose. This arrangement enables more than one contact portion to be positioned at a particular point along the conveyor. It is useful where, for example, the shape of the container is such that two contact portions are required at a particular point, for example, where a container has a relatively large bottom portion and a relatively narrow top portion. As can be seen in FIG. 7, the cap 84 is removed from the housing 83L so that the slot 82A can be used for connection of the housing 83L to a support bracket (not shown in FIG. 7).

Figure 10:
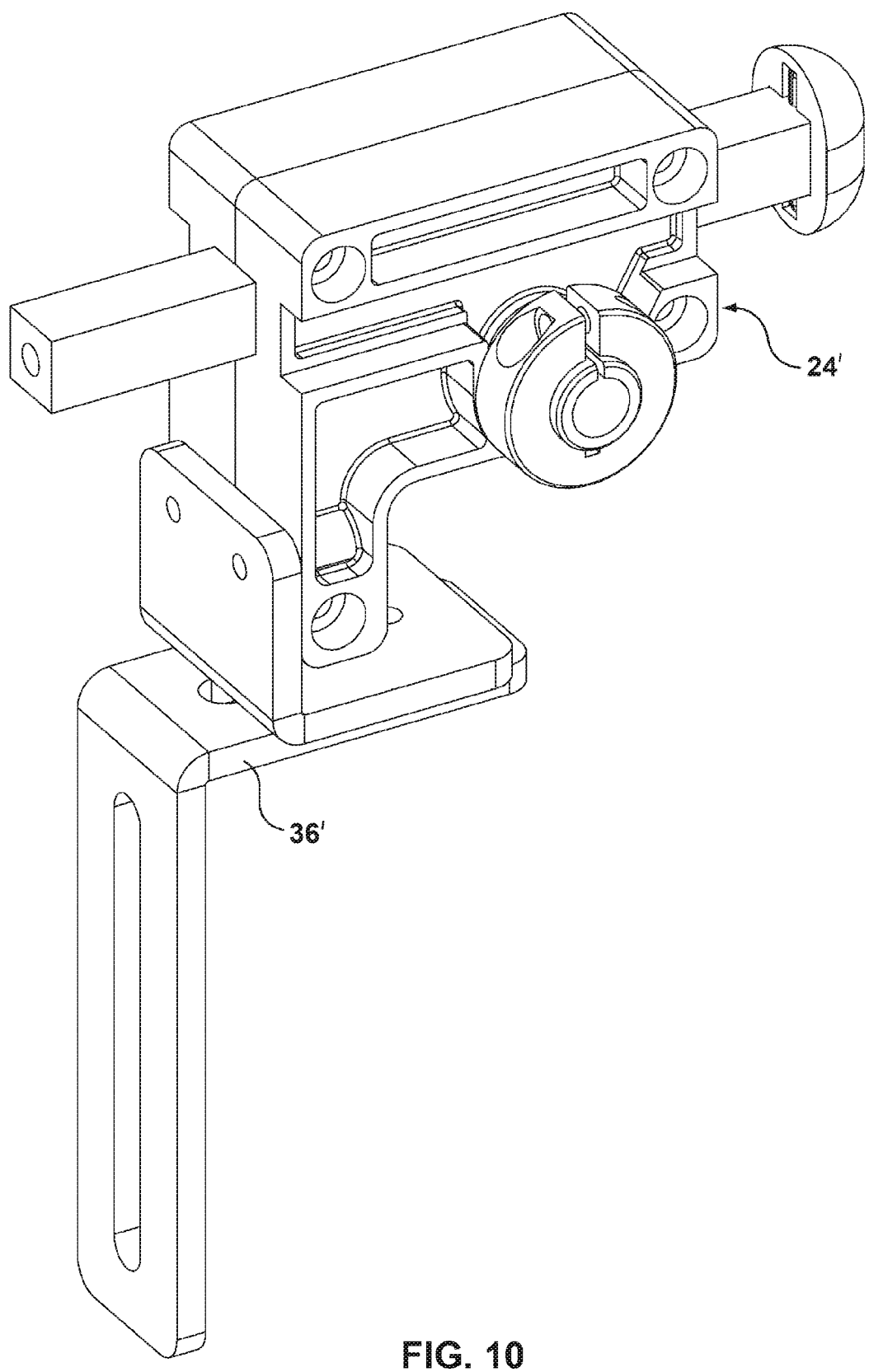
FIG. 10 is an isometric view of an alternative embodiment of the adjustable point device of the invention mounted on an alternative support bracket, drawn at a larger scale.

It will be understood that the adjustable point devices and the support brackets included in the guide rail system of the invention may take various forms. For instance, in FIG. 10, an alternative version of the adjustable point device 24' is shown mounted on an alternative version of the support bracket 36'.

As can be seen, for example, in FIGS. 3A and 3B, the guide rail system 10 preferably also includes the template element 40 for positioning the adjustable point devices 24 in preselected positions respectively relative to the conveyor 14. The template element 40 is intended for use in connection with the assembly and installation of the guide rail system 10. When assembling the guide rail system, it is necessary to locate and then secure the adjustable point devices (which preferably are to be supported by support brackets 36 respectively) in the appropriate positions relative to the conveyor. In particular, the adjustable point devices 24 positioned along in the curved segments need to be angularly aligned appropriately (i.e., radially aligned) to result in the slip rail assemblies 46 being properly positioned. The template element 40 facilitates this task.

Apertures 91 are provided in a body 92 of the template element 30 to position the adjustable point device 24 with appropriate angular alignment given its position vis-à-vis the conveyor (FIG. 3A). The support bracket 36 is positioned underneath the aperture 91, and the connector element attached to the support bracket extends upwardly through the aperture 91. The adjustable point device 24 can then be secured to the connector element 36 (i.e., via the connector element and fasteners) relatively quickly and easily. Further fine adjustment of the position of the adjustable point device 24 relative to the conveyor and the support bracket 36 preferably is possible, for example, by using an appropriately configured connector element.

In use, the drive element preferably is rotated via manual operation of the driving element, thereby causing the contact portions on the adjustment elements to move inwardly or outwardly, or upwardly or downwardly, as the case may be, simultaneously. Each contact portion moves substantially the same distance. The adjustable point devices 24 and the support brackets 36 of the invention provide a high degree of modularity and flexibility. The guide rail system can be relatively rapidly installed or removed, and the installed system provides for very fast adjustments to the positions of the contact portions when required due to changes in the containers moved on the conveyor.

Those skilled in the art will appreciate that the drive element may be rotated by various motive means. Any motive means which rotates the drive element and is provided with a suitable control may be suitable. For instance, the drive element may be rotated by a stepper motor, or a series of stepper motors (not shown). Using one or more stepper motors would provide for more rapid adjustment than using manual adjustment.

Those skilled in the art will also appreciate that the system of the invention is not necessarily installed in a substantially horizontal position, e.g., the system may be used where the conveyor(s) are at an angle to the horizontal, to ramp from one elevation to another.

It will be appreciated by those skilled in the art that the invention can take many forms, and that such forms are within the scope of the invention as described above. The foregoing descriptions are exemplary, and their scope should not be limited to the preferred versions provided therein.

We claim:

1. A guide rail system for guiding containers moved by at least one conveyor, said at least one conveyor at least partially defining a path along which the containers are moved thereby, the guide rail system comprising:
   a plurality of contact portions, for engaging the containers, to at least partially locate the containers in preselected positions on said at least one conveyor;
   a plurality of adjustable point devices, for locating the contact portions in predetermined locations respectively relative to said at least one conveyor, for engagement with the containers as the containers are moved past the contact portions by said at least one conveyor;
   each said adjustable point device comprising an adjustment element on which at least one of the contact portions is mounted, the adjustment element being movable relative to said at least one conveyor to position said at least one contact portion in the predetermined location therefor;
   a drive element connected to the adjustable point devices, to locate the adjustment elements for positioning said at least one contact portion respectively mounted thereon in the predetermined locations respectively;
   the path comprising at least one curved segment thereof at least partially defining an arc;
   the drive element comprising at least one flexible shaft substantially aligned with said at least one curved segment;
   selected ones of the adjustable point devices being spaced apart from each other along said at least one curved segment
   said at least one flexible shaft being connected to the selected ones of the adjustable point devices respectively, to position the contact portions mounted thereon in the predetermined locations therefor; and the contact portions mounted on the selected ones of the adjustable point devices defining a parallel arc spaced apart from the arc;
   a plurality of central contact portions, for engaging closures on the containers, to at least partially locate the containers in the preselected positions on said at least one conveyor;
   a plurality of central adjustable point devices, for locating the central contact portions in predetermined central locations respectively relative to said at least one conveyor, for engagement with the closures on the containers as the containers are moved past the central contact portions by said at least one conveyor;
   each said central adjustable point device comprising an adjustment element on which at least one of the central contact portions is mounted, the adjustment element being vertically movable relative to said at least one conveyor to vertically position said at least one central contact portion in the predetermined central location therefor;
   a central drive element connected to the central adjustable point devices, to position the adjustment elements for vertically positioning said at least one central contact portion respectively mounted thereon in the predetermined central locations respectively;
   the central drive element comprising at least one central flexible shaft substantially aligned with said at least one curved segment;
   selected ones of the central adjustable point devices being positioned at preselected central positions spaced apart from each other along said at least one curved segment; and
   said at least one central flexible shaft being connected to the selected ones of the central adjustable point devices respectively, to vertically position the central contact portions mounted thereon in the predetermined central locations therefor.

2. A guide rail system according to claim 1 in which the central contact portions mounted on the selected ones of the adjustable point devices substantially define a central arc substantially aligned with said at least one curved segment.

3. A guide rail system according to claim 1 in which the central contact portions mounted on the selected ones of the central adjustable point devices overlap with each other to provide at least one substantially continuous central surface for engagement thereby with the closures on the containers, as the containers are moved along said at least one curved segment.

4. A guide rail system for guiding containers on at least one conveyor along which the containers are moved thereby, the guide rail system comprising:
   a plurality of contact portions, for engaging the containers to at least partially locate the containers in preselected positions on said at least one conveyor;
   a plurality of adjustable point devices to locate the contact portions in predetermined locations respectively relative to said at least one conveyor, for engagement thereby with the containers as the containers are moved past the contact portions by said at least one conveyor;
   each said adjustable point device comprising an adjustment element on which at least one of the contact portions is mounted, the adjustment element being movable relative to said at least one conveyor to position said at least one contact portion mounted thereon in the predetermined location therefor;
   a drive element connected to the adjustable point devices to position the adjustment elements for locating said at least one contact portion respectively mounted thereon in the predetermined locations respectively; and
   a gear train for rotating the drive element, the gear train being adapted for resisting movement initiated at the drive element comprising:
      a gearbox;
      a driven gear rotatably mounted in the gearbox and operably connected to the drive element;
      a drive gear rotatably mounted in the gearbox and drivably coupled to the driven gear;
      a driving element drivably coupled to the drive gear, for driving the drive gear; and
      the driven gear and the drive gear having a gear ratio providing a mechanical advantage to driving the drive gear with the driving element such that the driven gear resists rotational movement thereof initiated at the drive element.

5. A guide rail system according to claim 4 additionally comprising:
   a plurality of central contact portions, for engaging closures on the containers, to at least partially locate the containers in the preselected positions on said at least one conveyor;
   a plurality of central adjustable point devices, for locating the central contact portions in predetermined central locations respectively relative to said at least one conveyor, for engagement thereby with the closures on the containers as the containers are moved past the central contact portions by said at least one conveyor;
   each said central adjustable point device comprising an adjustment element on which at least one of the central contact portions is mounted, the adjustment element being vertically movable relative to said at least one conveyor to vertically position said at least one central contact portion mounted thereon in the predetermined central location therefor;

a central drive element connected to the central adjustable point devices to position the adjustment elements for vertically locating said at least one central contact portion respectively mounted thereon in the predetermined central locations respectively; and a central gear train for rotating the central drive element, the central gear train being adapted for resisting movement initiated at the central drive element comprising:

a central gearbox;

a central driven gear rotatably mounted in the central gearbox and operably connected to the central drive element;

a central drive gear rotatably mounted in the central gearbox and drivably coupled to the central driven gear;

a central driving element drivably coupled to the central drive gear, for driving the central drive gear; and the central driven gear and the central drive gear having a central gear ratio providing a mechanical advantage to driving the central drive gear with the driving element such that the central driven gear resists rotational movement thereof initiated at the central drive element.

6. A guide rail system for guiding containers on at least one conveyor along which the containers are moved thereby, the guide rail system comprising:

a plurality of central contact portions, for engaging the closures on the containers to at least partially locate the containers in preselected positions on said at least one conveyor;

a plurality of central adjustable point devices, for locating the central contact portions in predetermined central locations respectively relative to said at least one conveyor, for engagement thereby with the closures on the containers as the containers are moved past the central contact portions by said at least one conveyor;

each said central adjustable point device comprising an adjustment element on which at least one of the central contact portions is mounted, the adjustment element being vertically movable relative to said at least one conveyor to vertically position said at least one central contact portion mounted thereon in the predetermined central location therefor;

a central drive element connected to the central adjustable point devices to position the adjustment elements for vertically locating said at least one central contact portion respectively mounted thereon in the predetermined central locations respectively; and a central gear train for rotating the central drive element, the central gear train being adapted for resisting movement initiated at the central drive element comprising:

a central gearbox;

a central driver gear rotatably mounted in the central gearbox and operably connected to the drive element;

a central drive gear rotatably mounted in the central gearbox and drivably coupled to the driven gear;

a central driving element drivably coupled to the central drive gear, for driving the central drive gear; and the central driven gear and the central drive gear having a central gear ratio providing a mechanical advantage to driving the drive gear with the central driving element such that the central gear train resists movement initiated at the central drive element.

7. A guide rail system for guiding containers moved by at least one conveyor, said at least one conveyor at least partially defining a path along which the containers are moved thereby, the guide rail system comprising:

a plurality of central contact portions, for engaging the closures on the containers, to at least partially locate the containers in preselected positions on said at least one conveyor;

a plurality of central adjustable point devices, for locating the central contact portions in predetermined locations respectively relative to said at least one conveyor, for engagement with the closures on the containers as the containers are moved past the central contact portions by said at least one conveyor;

each said central adjustable point device comprising an adjustment element on which at least one of the central contact portions is mounted, the adjustment element being movable relative to said at least one conveyor to position said at least one central contact portion in the predetermined central location therefor;

a central drive element connected to the central adjustable point devices and movable to position the adjustment elements for positioning said at least one central contact portion respectively mounted thereon in the predetermined central locations respectively;

the path comprising at least one curved segment thereof at least partially defining an arc;

the central drive element comprising at least one flexible central shaft substantially aligned with said at least one curved segment;

selected ones of the central adjustable point devices being positioned at preselected central positions spaced apart from each other along said at least one curved segment;

said at least one flexible central shaft being connected to the selected ones of the central adjustable point devices respectively, to position the central contact portions mounted thereon in the predetermined central locations therefor;

the central contact portions of the selected ones of the central adjustable point devices substantially defining a central arc substantially aligned with said at least one curved segment; and the central contact portions mounted on the selected ones of the central adjustable point devices overlapping with each other to provide at least one substantially continuous central surface for engagement thereby with the containers, as the containers are moved along said at least one curved segment.

8. A guide rail system for guiding containers moved by at least one conveyor, said at least one conveyor at least partially defining a path along which the containers are moved thereby, the guide rail system comprising:

a plurality of contact portions, for engaging the containers, to at least partially locate the containers in preselected positions on said at least one conveyor;

a plurality of adjustable point devices, for locating the contact portions in predetermined locations respectively relative to said at least one conveyor, for engagement with the containers as the containers are moved past the contact portions by said at least one conveyor;

each said adjustable point device comprising an adjustment element on which at least one of the contact portions is mounted, the adjustment element being movable relative to said at least one conveyor to position said at least one contact portion in the predetermined location therefor;

a drive element connected to the adjustable point devices, to locate the adjustment elements for positioning said at least one contact portion respectively mounted thereon in the predetermined locations respectively;

the path comprising at least one curved segment thereof at least partially defining an arc;

the drive element comprising at least one flexible shaft substantially aligned with said at least one curved segment;

selected ones of the adjustable point devices being spaced apart from each other along said at least one curved segment said at least one flexible shaft being connected to the selected ones of the adjustable point devices respectively, to position the contact portions mounted thereon in the predetermined locations therefor; and the contact portions mounted on the selected ones of the adjustable point devices defining a parallel arc spaced apart from the arc;

a plurality of central contact portions, for engaging closures on the containers, to at least partially locate the containers in the preselected positions on said at least one conveyor;

a plurality of central adjustable point devices, for locating the central contact portions in predetermined central locations respectively relative to said at least one conveyor, for engagement with the closures on the containers as the containers are moved past the central contact portions by said at least one conveyor;

each said central adjustable point device comprising an adjustment element on which at least one of the central contact portions is mounted, the adjustment element being vertically movable relative to said at least one conveyor to vertically position said at least one central contact portion in the predetermined central location therefor;

a central drive element connected to the central adjustable point devices, to position the adjustment elements for vertically positioning said at least one central contact portion respectively mounted thereon in the predetermined central locations respectively;

the central drive element comprising at least one central flexible shaft substantially aligned with said at least one curved segment;

selected ones of the central adjustable point devices being positioned at reselected central positions spaced apart from each other along said at least one curved segment;

said at least one central flexible shaft being connected to the selected ones of the central adjustable point devices respectively, to vertically position the central contact portions mounted thereon in the predetermined central locations therefor;

each said central adjustable point device comprising a rack and a pinion cooperating with each other, and each said adjustment element thereof comprises the rack thereof; and the central drive element being secured to and coaxial with the pinion thereof, such that rotation of the central drive element causes corresponding rotation of the pinion.

\* \* \* \* \*